United States Patent
Goodgoll

(10) Patent No.: US 7,170,430 B2
(45) Date of Patent: Jan. 30, 2007

(54) SYSTEM, METHOD, AND COMPUTER PROGRAM PRODUCT FOR SINGLE-HANDED DATA ENTRY

(75) Inventor: Michael Goodgoll, 72 John Street West, Waterloo, Ontario (CA) N2L 1B6

(73) Assignee: Michael Goodgoll, Waterloo (CA)

( * ) Notice: Subject to any disclaimer, the term of this patent is extended or adjusted under 35 U.S.C. 154(b) by 615 days.

(21) Appl. No.: 10/266,632

(22) Filed: Oct. 9, 2002

(65) Prior Publication Data

US 2003/0184452 A1  Oct. 2, 2003

Related U.S. Application Data

(60) Provisional application No. 60/367,724, filed on Mar. 28, 2002.

(51) Int. Cl.
*H03K 17/94* (2006.01)
*H03M 11/00* (2006.01)

(52) U.S. Cl. .................. 341/26; 341/22; 708/146

(58) Field of Classification Search ........... 341/20–34; 345/168; 400/479–486; 708/145, 146
See application file for complete search history.

(56) References Cited

U.S. PATENT DOCUMENTS

| | | | |
|---|---|---|---|
| 4,042,777 A | 8/1977 | Bequaert et al. | |
| 4,067,431 A | 1/1978 | Whitaker | |
| 4,211,497 A * | 7/1980 | Montgomery | ............... 400/486 |
| 4,333,097 A | 6/1982 | Buric et al. | |
| 4,360,892 A | 11/1982 | Endfield | |
| 4,414,537 A | 11/1983 | Grimes | |
| 4,443,789 A | 4/1984 | Endfield et al. | |
| 4,490,056 A | 12/1984 | Whitaker | |
| 4,498,073 A * | 2/1985 | Fisher et al. | .................. 341/25 |
| 4,516,939 A | 5/1985 | Crimmins, Jr. | |
| 4,988,997 A | 1/1991 | Prame | |
| 5,007,008 A * | 4/1991 | Beers | ......................... 708/145 |
| 5,087,910 A | 2/1992 | Guyot-Sionnest | |
| 5,189,416 A | 2/1993 | Estes | |
| 5,267,181 A | 11/1993 | George | |
| 5,281,966 A * | 1/1994 | Walsh | ........................ 341/22 |
| 5,288,158 A | 2/1994 | Matias | |
| 5,367,298 A | 11/1994 | Axthelm | |
| 5,424,730 A * | 6/1995 | Sasaki et al. | ................. 341/25 |
| 5,432,510 A | 7/1995 | Matthews | |
| 5,434,566 A * | 7/1995 | Iwasa et al. | .................. 341/34 |

(Continued)

FOREIGN PATENT DOCUMENTS

GB  2 133 745 A  8/1984

(Continued)

OTHER PUBLICATIONS

Including hardcopy of WO 01 53924 and GB 2 364 856.

*Primary Examiner*—Timothy Edwards, Jr.
(74) *Attorney, Agent, or Firm*—Bereski & Parr

(57) ABSTRACT

A system, method and computer program product that permits a user, using the fingers of a single hand, to produce defined outputs such as generating characters for text input and executing commands. In a data processing system having plural input detectors, the invention comprises permitting the user to perform sequential gestures with the fingers of one hand to produce the defined outputs.

81 Claims, 24 Drawing Sheets

U.S. PATENT DOCUMENTS

| | | | |
|---|---|---|---|
| 5,493,654 A | 2/1996 | Gopher et al. | |
| 5,510,783 A * | 4/1996 | Findlater et al. | 341/34 |
| 5,515,305 A | 5/1996 | Register et al. | |
| 5,552,782 A | 9/1996 | Horn | |
| 5,675,329 A * | 10/1997 | Barker et al. | 341/22 |
| 5,745,056 A | 4/1998 | Takahashi et al. | |
| 5,793,312 A | 8/1998 | Tsubai | |
| 5,798,716 A * | 8/1998 | Davis | 341/26 |
| 5,812,171 A | 9/1998 | Kim | |
| 5,900,864 A | 5/1999 | Macdonald | |
| 5,914,676 A * | 6/1999 | Akpa | 341/23 |
| 5,982,303 A | 11/1999 | Smith | |
| 5,993,089 A | 11/1999 | Burrell, IV | |
| 6,031,471 A | 2/2000 | Wilson | |
| 6,057,788 A | 5/2000 | Cummings | |
| 6,102,594 A | 8/2000 | Strom | |
| 6,198,474 B1 * | 3/2001 | Roylance | 345/168 |
| 6,231,252 B1 | 5/2001 | Kitamura | |
| 6,232,956 B1 | 5/2001 | Mailman | |
| 6,271,835 B1 | 8/2001 | Hoeksma | |
| 6,278,384 B1 | 8/2001 | Ide | |
| 6,307,541 B1 * | 10/2001 | Ho et al. | 345/171 |
| 6,333,734 B1 | 12/2001 | Rein | |
| 6,348,878 B1 | 2/2002 | Tsubai | |
| 6,378,234 B1 * | 4/2002 | Luo | 341/22 |
| 2001/0021332 A1 | 9/2001 | Boldy et al. | |
| 2001/0028340 A1 | 10/2001 | Mailman | |
| 2001/0048378 A1 | 12/2001 | Horie | |
| 2001/0054972 A1 | 12/2001 | Yoneya | |
| 2002/0000922 A1 | 1/2002 | Hosaka et al. | |
| 2002/0005837 A1 | 1/2002 | Thomason et al. | |
| 2002/0027549 A1 | 3/2002 | Hirshberg | |
| 2002/0063687 A1 | 5/2002 | Kim | |
| 2002/0070923 A1 | 6/2002 | Levy et al. | |
| 2002/0097227 A1 | 7/2002 | Chu et al. | |
| 2002/0175834 A1 | 11/2002 | Miller | |
| 2004/0070522 A1 * | 4/2004 | Tsubai et al. | 341/22 |

FOREIGN PATENT DOCUMENTS

| | | |
|---|---|---|
| WO | WO 85/01914 | 5/1985 |
| WO | WO 95/13576 | 5/1995 |
| WO | WO 95/32461 | 11/1995 |

* cited by examiner

FIG. 2B
FIG. 2C
FIG. 2A
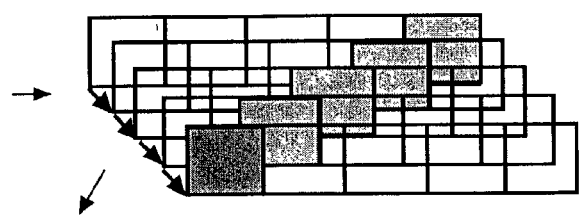
| d | . | , | q | z |
|---|---|---|---|---|
| y | l | g | o f | j |
| c | a | t p | s | x |
| u | n k | i | w | ← |
| e v | h | r | m | b |
200

← Short duration
● long duration
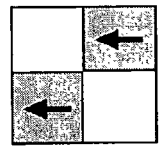 FIG. 2F  null / null
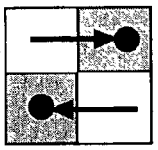 FIG. 2J  at / in
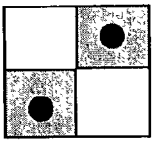 FIG. 2G  t / n
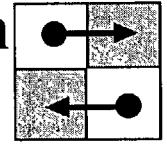 FIG. 2K  an / it
 FIG. 2H  a / i
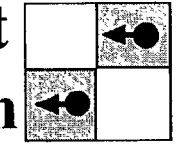 FIG. 2L  pt / kn
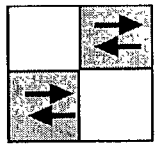 FIG. 2I  p / k

FIG. 5

| | |
|---|---|
| ① | space . 1 ? ! , @ & % $ ; : |
| ②abc | a b c 2 ä å â ã à α β ç |
| ③def | d e f 3 Σ δ ë é è ê φ |
| ④ghi | g h i 4 ï í ì γ |
| ⑤jkl | j k l 5 λ ( ) |
| ⑥mno | m n o 6 ñ ö ø ó ò ô ö ω |
| ⑦prs | p q r s 7 π β σ |
| ⑧tuv | t u v 8 θ ü ú ù û |
| ⑨wxy | w x y z 9 ξ ψ |
| ⓪ | + - 0 X * / \ [ ] = > < # |

Speed Tip

Here is a tip to speed up the way you type a series of letters which have chord labels of the same color: Keep holding down the top row key with your index finger while your other fingers form chord after chord with keys on the lower rows. Try this example.

Type the word pin.

First press the chord for lowercase p (L0L0)—a red-labeled chord. Then lift your ring finger from the third row while continuing to hold down the red-dotted key in the top row with your index finger. (Notice that a p appeared when you released your ring finger.) Now use your middle finger to press and release the right-hand key in the second row. (Note that it is next to the red label I.) You just typed a lowercase i (LR00). Again, keeping the red-dotted key down, release your middle finger from the second row and reach with your little finger for the middle key in the bottom row (labeled with the red N) to form the chord for lowercase n (L00M).

Finally, release both top and bottom keys. This technique will help you type faster by avoiding unnecessary finger movements. You can use this with many combinations of letters: st, ry, in, lo... Can you find some others?

FIG. 20

| CHORD | | CHARACTER | CHORD | | CHARACTER |
|---|---|---|---|---|---|
| OSN | MMMM | MOUSE OFF | O | MMMO | / |
| OSN | LLLL | MOUSE ON | N | OLOO | 0 |
| OSN | OOLO | BKSP | N | ROOO | 1 |
| O | MMOM | TAB | N | OROO | 2 |
| S | MMOM | BTAB | N | OORO | 3 |
| OSN | OOOL | ENTER | N | OOOR | 4 |
| OSNF | RRRO | ESC | N | MOOO | 5 |
| | ROOO | LEFT | N | OMOO | 6 |
| | MOOO | LEFT+INV EXIT | N | OOMO | 7 |
| | LOOO | RIGHT | N | OOOM | 8 |
| M | OROO | DBL+LEFT | N | LOOO | 9 |
| M | OMOO | DBL+MIDDLE | O | OORL | : |
| M | OLOO | DBL+RIGHT | O | ROOR | ; |
| M | OORO | CTRL+LEFT | N | MOOL | < |
| M | OOMO | SHIFT+LEFT | O | OOMR | = |
| M | OOLO | ALT+LEFT | N | RORO | > |
| M | OOOR | TOGGLE+LEFT | O | RLOO | ? |
| M | OOOM | TOGGLE+RIGHT | O | OOLR | @ |
| M | OOOL | SHIFT+DBL+LEFT | O | ROOO | a |
| OS | LOOO | SPACE | O | OROO | b |
| O | ROLO | ! | O | OORO | c |
| O | ROMO | " | O | OOOR | d |
| O | OMOL | # | O | MOOO | e |
| O | OLRO | $ | O | OMOO | f |
| O | OORM | % | O | OOMO | g |
| O | OLOL | & | O | OOOM | h |
| O | RMOO | ' | O | LROO | i |
| O | OLLO | ( | O | LORO | j |
| O | ORLO | ) | O | LOOR | k |
| O | OOLM | * | O | LMOO | l |
| O | OOML | + | O | LOMO | m |
| O | RORO | , | O | LOOM | n |
| O | ROOL | - | O | LLOO | o |
| O | RROO | . | O | LOLO | p |

Thumb Key Table:
O = No thumb key pressed
S = SHIFT
N = NUM
F = Both NUM and ALT are pressed
M = Mouse (including mouse mode)

When multiple thumb keys are indicated, it means that the symbol or function indicated is accessed by pressing any of the thumb keys.

FIG. 21

SYSTEM, METHOD, AND COMPUTER PROGRAM PRODUCT FOR SINGLE-HANDED DATA ENTRY

CROSS-REFERENCE TO RELATED APPLICATIONS

This application claims the benefit of U.S. Provisional Application No. 60/367,724, filed Mar. 28, 2002, titled "System, Method, and Computer Program Product for Single-handed Data Entry," which is incorporated herein by reference.

BACKGROUND OF THE INVENTION

1. Field of the Invention

The invention described herein comprises a system, method, and computer program product for single-handed input of alphanumeric characters and associated commands on a variety of communication devices, including mobile phones, PDA's and computers, and the like.

2. Background Art

The advent of worldwide communication networks and mobile computing devices, such as phones, PDA's, wireless pagers, etc., has stimulated immense research into and development of new and more efficient means for fast, reliable text input. The continuing development of Short Message Services (SMS) and of even more complex MultiMedia Services (MMS) has made the issue of text input increacingly important. A successful, universally usable-method of text input is an essential requirement for the success of emerging technological advances in mobile computing.

To ensure the efficient operation of any new method of input, a number of important problems should be addressed, that are simultaneously required for its efficient operation. Morse code (single and double keyer methods) and touch-typing on QWERTY keyboards have been universally adopted and used successfully for generations. By examining some important parameters of text input shared by these methods, we can establish a conceptual framework within which to discuss the existing techniques.

It appears that they hold in common the following features:

Universal: Both allow multiple languages to be accessed. Morse code quickly became a worldwide method of communication. The QWERTY layout and mechanism have been adopted throughout the world with minor differences dependent on the language used.

Ergonomic: Their use is related to normal coordinated movement involving simultaneously overlapping actions, which are both timed and sequential.

Automatic: They allow for automatic skill to develop that does not require conscious monitoring, and therefore places few cognitive demands on the user after the initial learning period.

Independent of Vision: For both systems, after skilled targeting or timing have developed, visual monitoring of the input and confirmation of output is not constantly required.

Efficient and Accurate: High speed of input with a low error rate is achieved by both methods.

Economical: The technology involved is inexpensive to produce and is available to a wide range of consumers.

Multi-functional: These systems allow the user to focus on parallel activities as attentional requirements are not overly demanding. Morse code is a particular case in point, since it requires only one hand and can be used in a variety of situations.

The features listed above provide the context in which to discuss text entry techniques. A number of alternative approaches have been developed in the search for successful methods of text input in mobile environments. Text entry using soft keyboards and reduced keyboards with fewer keys have been developed by a number of commercial enterprises. Input methods include sequential, coded entry as well as numerous variations of chord keyboards, where entry is by combinations of simultaneously activated keys. A close examination of the movement patterns required by these methods reveals an important ergonomic design flaw common to them all that underlies the difficulty their users experience Soft keyboard input uses a single activator (stylus or finger) to select directly from a full-alphabet display. This is similar to typing with a single finger. Although the target for each character remains constant, the actual trajectory of the stylus moving to any one key will depend on the location of the previously activated key. Each key therefore has multiple trajectories associated with its activation. The need to visually guide the stylus visually results from this one-to-many relationship. It is therefore practically impossible to learn the multiple pathways to a key and reproduce them by touch alone.

Much research has occurred aimed at facilitating this jumping requirement by designing the most efficient and ergonomic layout to minimize the degree of movement needed. This research uses Fitt's equation relating distance traveled and time taken for moving from target to target. (See D. Hughes et al., "Empirical bi-action tables: A tool for the evaluation and optimization of text input systems. Application I: Stylus keyboards" *Human-Computer Interaction*, 17, (2002), Lawrence Erlbaum Associates, Inc. Hughes et al. relate the inter-key time parameters of a defined keyboard matrix to various alphabetic layouts. They optimize the layout using standard heuristic algorithms (e.g., the ant algorithm) to define the most efficient layout. Using a digraph table of 26 letters plus space, Hughes et al. compute the most effective layout. Because their concern is the physical tapping time required for accessing sequential characters, their focus is on arranging the letters to maximize typing speed.

However, increased speed when tapping with one finger or a stylus can also result in ever increasing tension and rigidity of muscles and movement. This method does not take advantage of the capacity for coordinated overlapping movements naturally available to a five fingered hand. It also requires constant visual monitoring and therefore precludes touch-typing. Because of its attentional demands, using this method makes it difficult to engage simultaneously in other parallel activities, such as walking. It is inherently dependent on sophisticated technologies like touch screens.

The number of keys on a keyboard can be reduced, and sequences of keystrokes programmed to represent different outputs. These methods are described as two-stroke or sequential input. The reduction can be applied to both physical as well as soft keyboards (e.g., onscreen). An example of the former is U.S. Pat. No. 6,348,878 (the '878 patent) to Tsubai, which states that: "A keyboard layout for a one-handed keypad having fifteen alphabetic keys. Each key has a primary letter and a secondary letter. The primary letter is keyed by solely striking the key, while the secondary letter requires striking a secondary key first or simultaneously with the primary alphanumeric key. The layout placement minimizes finger travel and keystrokes to generate the most common letters and digraphs in the English language."

According to the '878 patent, each letter of the alphabet requires activation of a particular sequence of fingers. Individual fingers move in two directions to press a key, both up and down and across the three levels of keys from upper, to home, to lower. It is apparent that in repeated typing of a particular letter in different word contexts, the position of each finger will differ depending on its involvement in typing a prior letter. Multiple trajectories and combinations of trajectories will be used to type a particular letter. Thus, although each letter is coded by a single key sequence, the movements used in activating the sequence do not have a one-to-one relationship to the codes.

This inherent complexity goes unnoticed in the usual description of this and numerous other methods involving reduced keyboards. It may be noted here that the standard method of touch-typing on a QWERTY keyboard is designed precisely to reduce the number of alternate movements required by each finger. Maintaining a strict obedience to the rules of touch-typing is a means of reducing the complexity of movement required. Some fingers (the index fingers) still need to access at least six keys each. It is this remaining complexity that ensures that most individuals need a period of learning and practice to develop skilled "eyes-free" typing.

MessagEase, from Exideas Inc., is an example of a reduced soft keyboard. It is described as a 12 key two-keystroke method of text entry using a telephone keypad or Palm Pilot PDA, where a virtual onscreen keyboard version is accessed with a stylus. The 9 most common letters are entered by double pushes of one of the 9 number keys. A further 8 letters are entered by sequential two-key pushes from the periphery to the center key (the number 5) and another 8 emanate from the center key outwards to the peripheral keys. Extra characters are coded on the remaining 3 keys. There is no timeout provided. As a result, if a key is pushed in error it is registered as part of the sequence. Should a key be missed in error, the subsequent code will also be incorrect. To avoid this, continual visual monitoring is required for avoidance and correction of errors.

Two sequential activations are taken to represent a single code (e.g., alphanumeric output). Again, the distinction between coding and the actual finger movements needed to create the codes is important. One finger is typically used to input the code. The resultant movement is therefore a single actuator jumping from one location to another. The coding requires sequential activation but the movement used is similar to the repetitive activation of a single key.

This issue is not eliminated even if all fingers are used, as in U.S. Pat. No. 4,333,097 (the '097 patent) to Buric et. al., titled "Visual Display Terminal Without Finger Repositioning." The '097 patent discloses a keyboard of 10 keys, one per finger, to eliminate the need to reposition the fingers and also reduce the targeting requirements. Selected characters are displayed on a screen, horizontally above and below a default list of ten characters, and the thumb keys move the display up or down to the next layout. Frequency of occurrence of characters in English, as well as relative strength of fingers, are factored into the selection of characters. More frequently used characters require fewer key inputs. Note that the exact sequence of key pushes to get to a character will depend on the position of the display as determined by the previous letter. Since a multiple movement sequence is possible for each character, one must determine by visual inspection where the display was positioned in order to work out the appropriate sequence of key pushes. Thus, although all ten fingers are involved, it is still not possible to touch type using this method.

Chord keyboards present a similar problem. They have a reduced number of keys and use combinations of keys to code the output characters. Tables of finger combinations are provided that appear to represent a single combination for each letter. In chord keyboards the moment of activation of the resultant character output in chord keyboards must be coincident with the release of the keys, as only then is it possible to determine which accumulated combination of keys was selected. The consecutive combinations of chords can only be input at the speed attainable by the repeated finger in common to a number of chords. For example, if a series of chords consist of 123-245-23 then the 2 is repeating.

Some chord methods also include "latching", where a finger common to two consecutive chords is held while changing from one to the next. Presented as a tip to increase speed by reducing the number of key presses, this technique has inadvertent consequences, which adversely affect the relationship of movements to codes. Holding down a common finger creates many alternative fingerings for the same letter, which again makes the fingering of one letter dependent on the preceding letter. The unnoticed complexity of the Twiddler approach, for example, (Twiddler User Manual Rev 1.6, Handykey Corporation, Page 14–15 (2000)) lies in the problem of selecting which finger to release while simultaneously pressing the required finger. The Twiddler "Speed Tip" approach is reproduced in FIG. 20. Based on this Twiddler approach:

a) p=24 i=23 n=25, with a release order of 4-3-5, therefore i=hold 2, exchange 4 and 3 in that order, and release 3.

b) n=25 i=23 p=24, with a release order of 5-3-4, therefore i=hold 2, exchange 5 and 3 in that order and release 3.

Care must be taken to control the order of movements. For example, if the order is reversed in (a), and the 3 is placed before the 4 is released, a new, different code representing a combination of all three fingers will be created. A single "i" is also produced by placing 2 and 3, and releasing both in any order.

The Twiddler approach uses 12 keys accessed by four fingers, so additional complexity comes from the necessity to select which of three rows of keys ((L)eft,(M)iddle or (R)ight) to use. Considering the permutations of release sequences created by the possible preceding 26 letters, and further compounding the release sequences with three targets for each finger, it is apparent how extremely demanding this method really is. A list of finger codes that usually accompanies chord keyboards, is therefore unintentionally, but inherently an over-simplification. No quick method of referring to unknown codes or forgotten key sequences appears available for real time access. The attraction of this method lies in the reduced number of keys required, but it is the hidden complexity of movement it demands (rather than the coding) that explains why, over a 150 year period, this method has never been widely used.

The recent widespread development and use of miniaturized QWERTY keyboards, as in the Blackberry PDA (Research In Motion Limited, Waterloo, Ontario, Canada), raises similar ergonomic issues. The primary motivation for this method is familiarity with the QWERTY layout. However, the original ergonomics of the QWERTY keyboard are disrupted owing to the small size of the miniaturized versions' keys, making the development of automaticity—the most significant feature of the full-size keyboard—practically impossible. Under constant visual guidance, and while holding the device with both hands at a distance sufficient to read the tiny letters on the keys and the small text output, two thumbs (the largest fingers) are required to push these very small keys Touch typing was never envisaged for the Blackberry PDA, nor was extensive text input, owing purely to the physical demands made on single fingers.

It is of interest to note that the only research available to date on the use of thumb keyboards begins to show some awareness of the significance of true sequential input. "The time between keystrokes when using one thumb to repeatedly type the same key is tREPEAT. When using two thumbs to repeatedly alternate between two keys, the keystroke rate almost doubles because the movement of the two thumbs overlaps." (I. S. MacKenzie et al., "A model of two-thumb text entry," *Proceedings of Graphics Interface* 2002, (Toronto: Canadian Information Processing Society, pp. 117–124 (2002).)

In summary, the methods described above lack some or all of the essential characteristics for efficient text input outlined in the opening statement. Any method requiring constant visual attention or complex variable sequences of movements for each character, using only one or two fingers of the hand, precludes the development of an automatic, cognitively undemanding method of text input in a mobile, multi-functional environment. Hence, a need exists for an economical system and method for character entry in multiple languages, which can be performed automatically, with low cognitive demands and in a multiplicity of environments.

BRIEF SUMMARY OF THE INVENTION

The present invention is directed to a system, method, and computer program product for text input using two or more input detectors (e.g., keys) and the fingers of one hand. In its preferred embodiment, five keys are used for text input and a sixth key is used to access additional groups of characters, commands, functions, and the like. Because each finger does not need to leave its key, no targeting is required. The user can quickly gain the ability to type without constant visual monitoring.

The invention works with natural movements and requires minimal learning. A combination of single and sequenced key pushes inputs characters on any associated device. The invention involves the organization of movements into hierarchic groups, facilitating the ready generation of skilled sequences of movement. The average efficiency rate is approximately 1.45 key strokes per character (KSPC). With the aid of a graphical guide or display, the user is able to begin typing immediately. Adequate speed for effective input is attainable after a short period of practice.

In an embodiment of the present invention, a user expresses characters of an alphabet using one or two keystrokes. For some characters, the user performs and sustains one of the keystrokes by holding down the key for a predetermined time. For other characters, the user performs keystrokes in sequence. Use of a sixth key allows the user to express additional characters.

The system of the invention can be embodied as a keypad, or it can be embodied as a reprogrammed QWERTY keyboard. Alternatively, the invention can be embodied in another information device, such as a cell phone, personal data assistant, or the like. It can also be embodied in the form of detectors attached to each finger, creating a "keyboard" which corresponds with the natural position of the hand and only requires contact with an available surface for functional use.

An embodiment of the present invention is directed to a system, method, and computer program product that permits a user, using the fingers of a single hand, to produce defined outputs such as generating characters for text input and/or executing commands. In preferred embodiments of the present invention the number of input detectors is 5, 6 or 7. However, additional input detectors can be used. In a data processing system having plural input detectors, the most general case of the invention comprises permitting the user to perform three separate gestures with the fingers of one hand.

Accordingly, the first gesture type, which comprises a single activation for longer than a predetermined period to produce a single output, is also referred to as a long activation. The second gesture type, which comprises a sequential activation of two input detectors to produce a single output, is produced by two short activations, so long as the second activation follows the first activation within a predetermined period. The third type of gesture, which comprises sequential activations to produce two outputs, comprises a short activation followed within a predetermined period by a long activation. The second output produced by the third type gesture is a function of the first activated detector if that activation is a long activation, or a function of the second detector if activation of the second detector comprises a long activation.

According to an embodiment of the present invention, concatenations of the second and third type gestures can be used to produce additional outputs.

According to the present invention these three gestures are used to output characters or execute commands by relating sequential activations of detectors to digraph probabilities of a language writing system, resulted in a maximal ratio of digraphs output to total activations.

Accordingly, the present invention can be configured to work with many different language systems. Alternatively, the commands output by the gestures of the present invention can correspond to various program functionalities. For example, the present invention can be adapted to, or implemented in, a variety of appliances or devices such as; cell phone or telephone key pad, television, audio, or home security remote control, an automotive control pad or system. In particular, pressure or other types of sensors, attached to the fingertips are envisioned embodiments of this invention. It applies as well to any other consumer, commercial or military device that lends itself to control by a user using keys, touch sensitive LCD screens/pads, or the like.

A device or data processing system for implementing the present invention comprises a plurality of input detectors, an activation recognition unit coupled to the input detectors, which determines whether activation was produced by a users fingers, and a converter coupled to the activation recognition unit, which produces outputs based on a set of rules depending on detection of single activations or sequential activations having the first or second timing conditions. Additionally, a display structured as a diagonalized stem-and-tree diagram can be presented to the user to aid in input.

Further embodiments, features, and advantages of the present inventions, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIGS. 1A and 1B illustrate embodiments of the system of the present invention, allowing one-handed expression of character data.

FIGS. 2A–C and 2E–L illustrate a diagonalized stem and leaf diagram, according to the present invention.

FIG. 2D illustrates a stem-and-leaf diagram.

FIGS. 3A and B illustrate an expanded, diagonalized stem-and-leaf diagrams, according to the present invention.

FIG. 5 illustrates a table of all possible outputs of the diagram in FIG. 2A.

Figure 6:
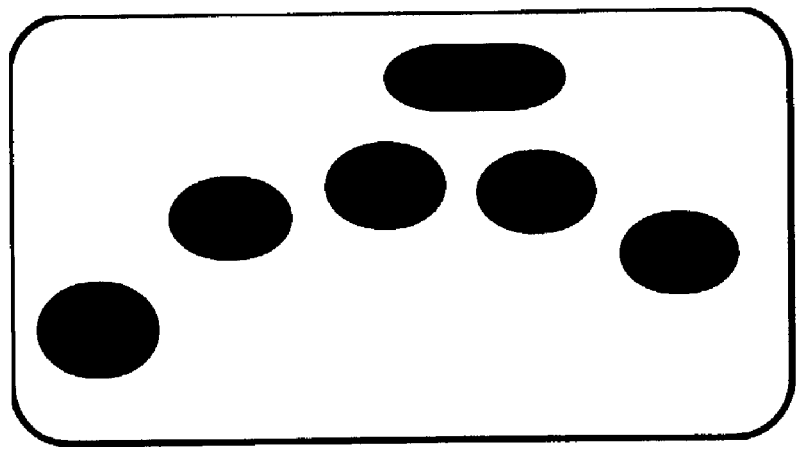
Figure 7:
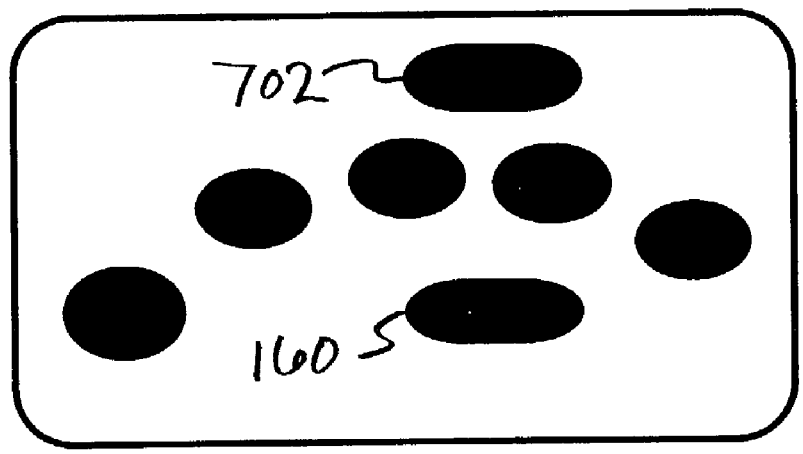
Figure 8:
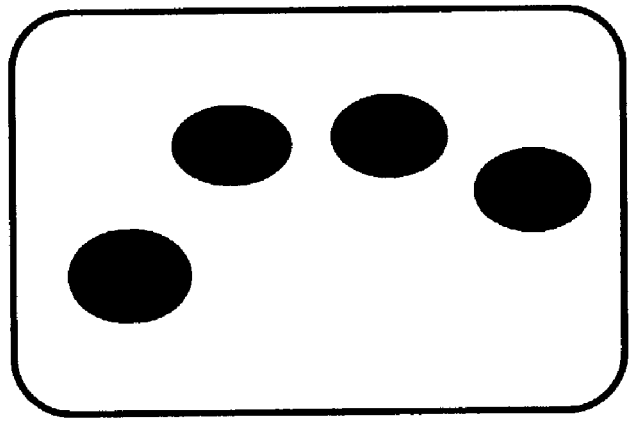

FIGS. 6, 7, and 8 illustrate exemplary input detector layouts, according to the present invention.

Figure 9:
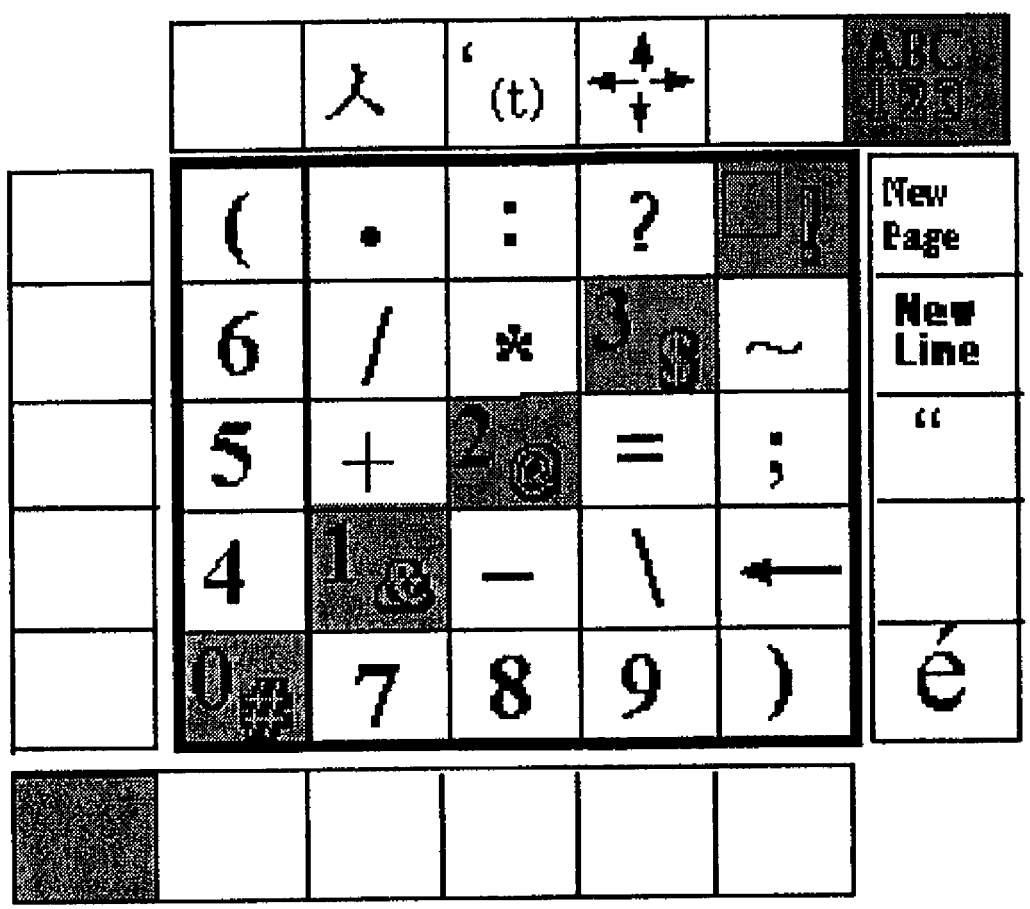

FIG. 9 illustrates a diagonalized stem-and-leaf diagram depicting a number character set, according to the present invention.

FIG. 10 illustrates a Multitap system to type characters.

Figures 11A, 11B, 11F:
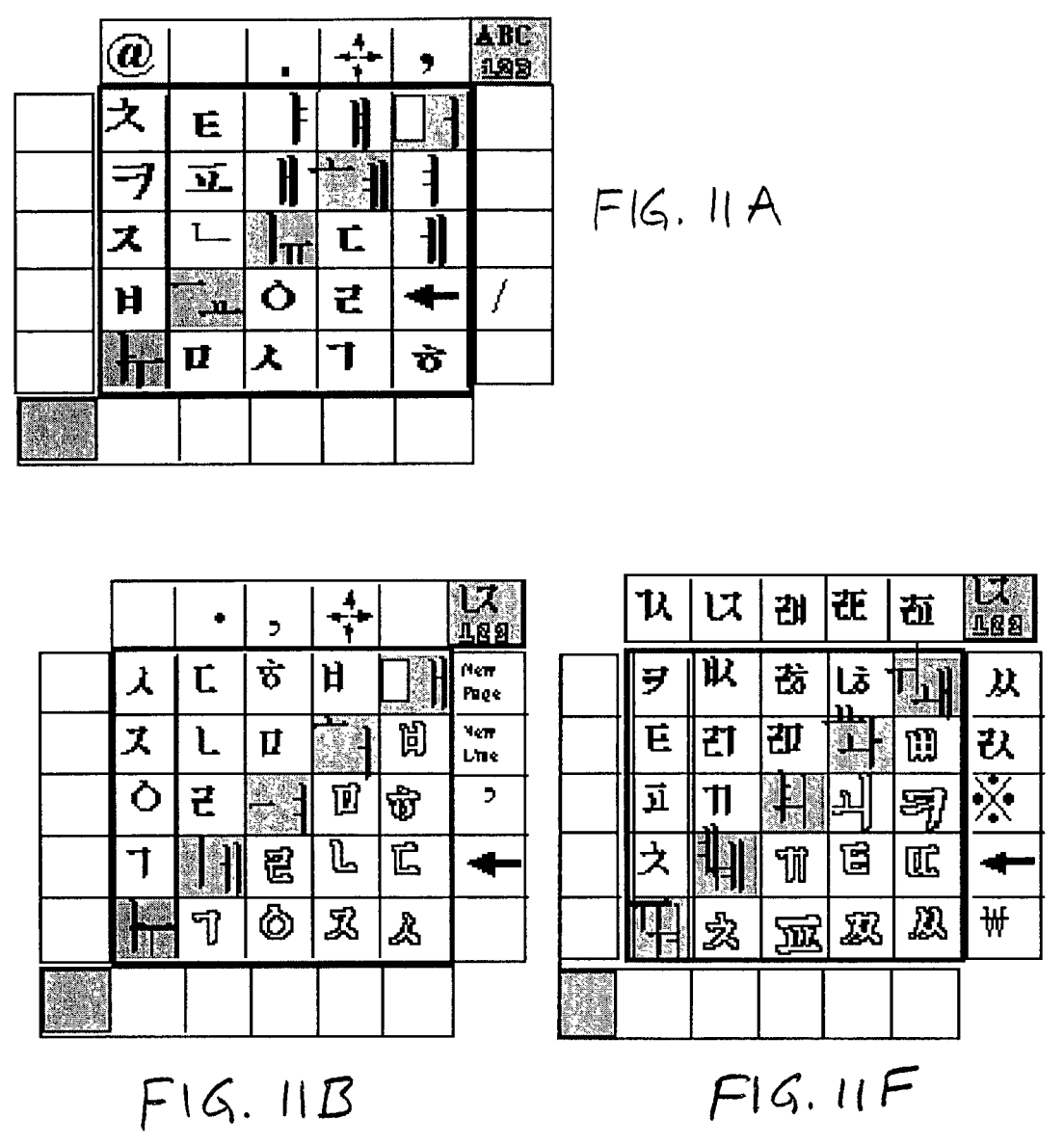

FIGS. 11A, 11B and 11F illustrate exemplary diagonalized stem and leaf diagrams for implementing a Korean character set, according to the present invention.

Figures 11C, 11D:
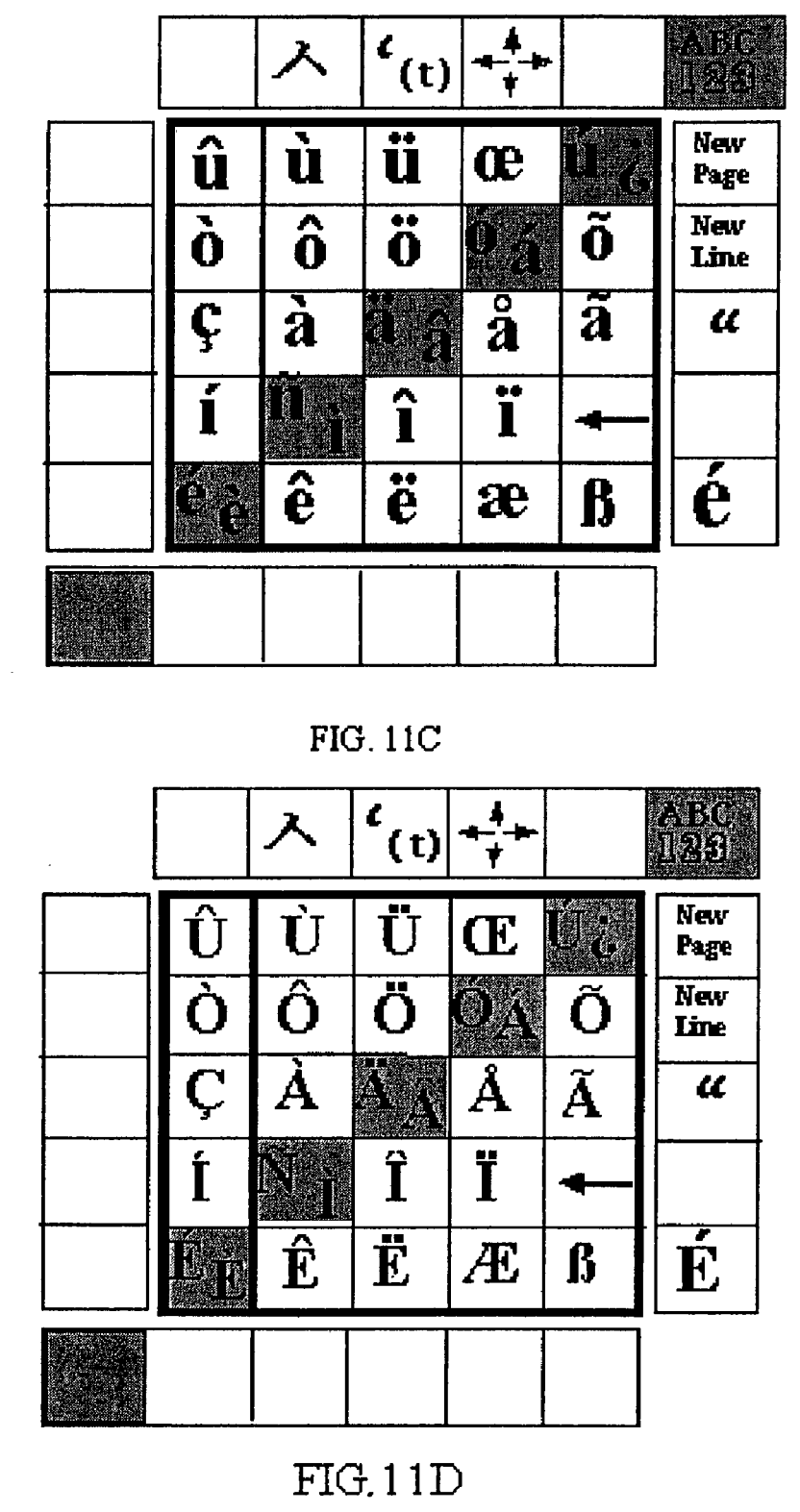
Figure 11E:
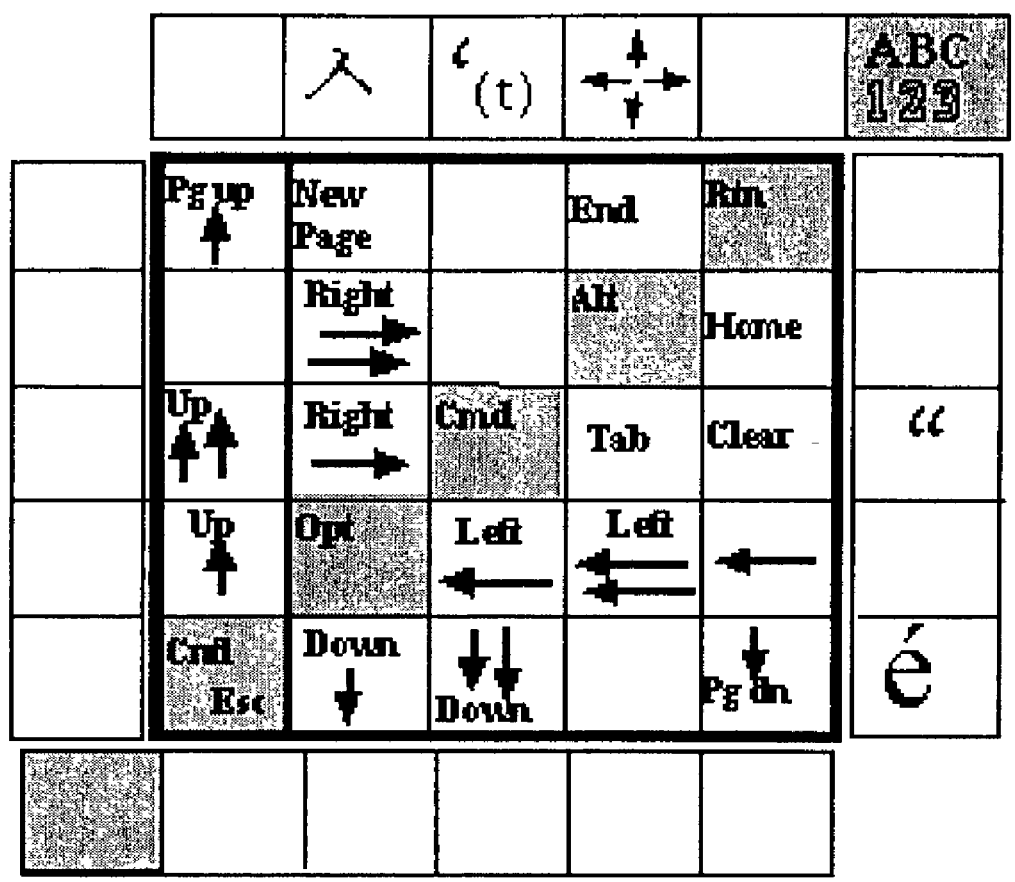

FIGS. 11C and 11D illustrate diagonalized stem and leaf diagrams depicting an accent character set, according to the present invention FIG. 11E illustrates a diagonalized stem and leaf diagram depicting cursor control and editing functions, according to the present invention.

FIGS. 12, 13A–B, 14A–D, 15A–D, 16 and 17A–D illustrate timing diagrams for Gestures 1–3, according to the present invention.

Figure 18A:
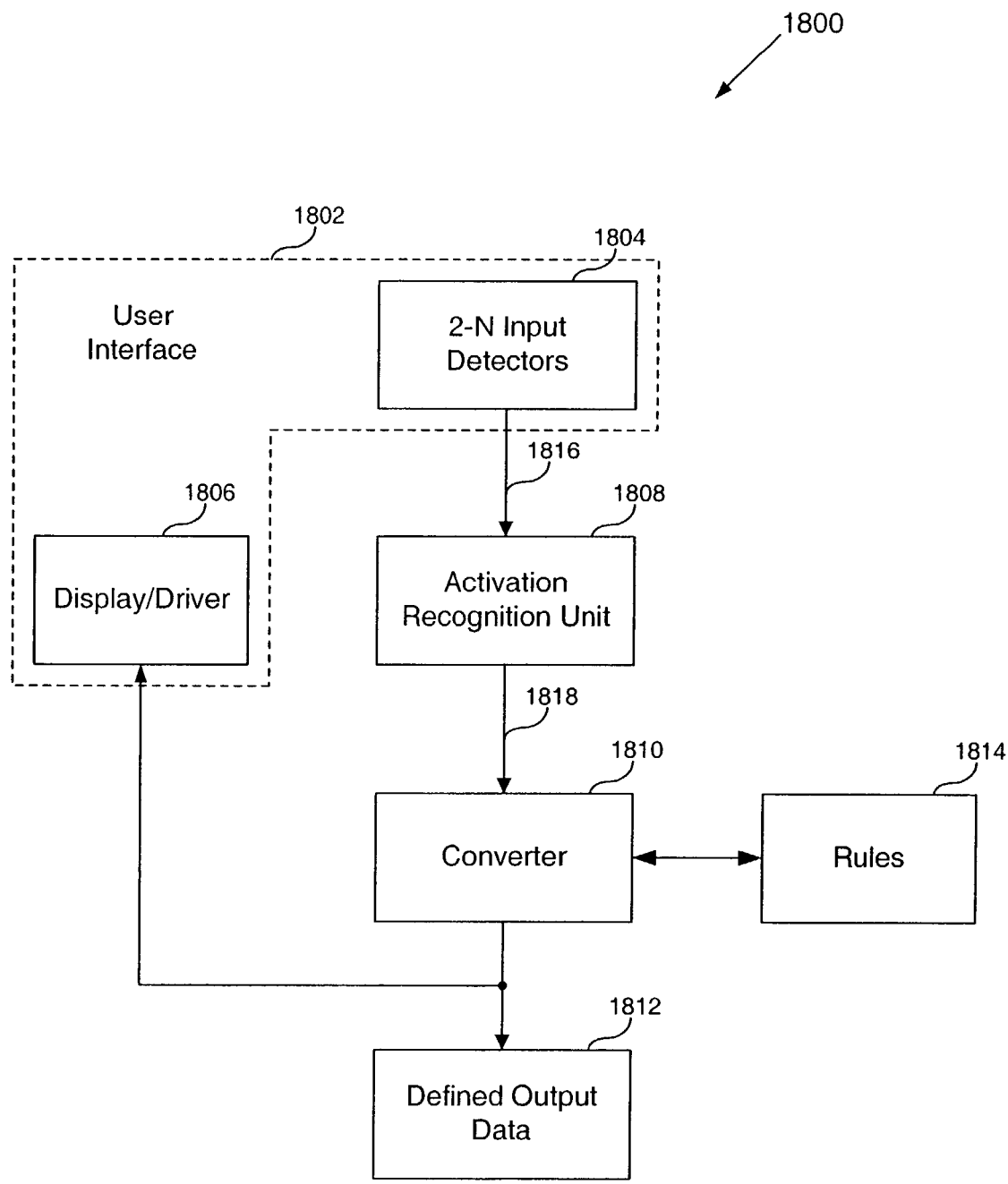
Figure 18B:
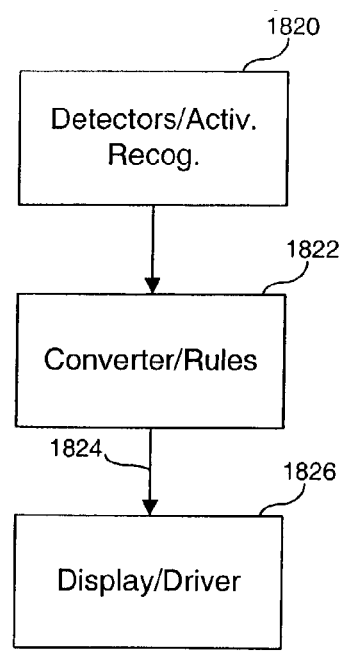
Figure 18C:
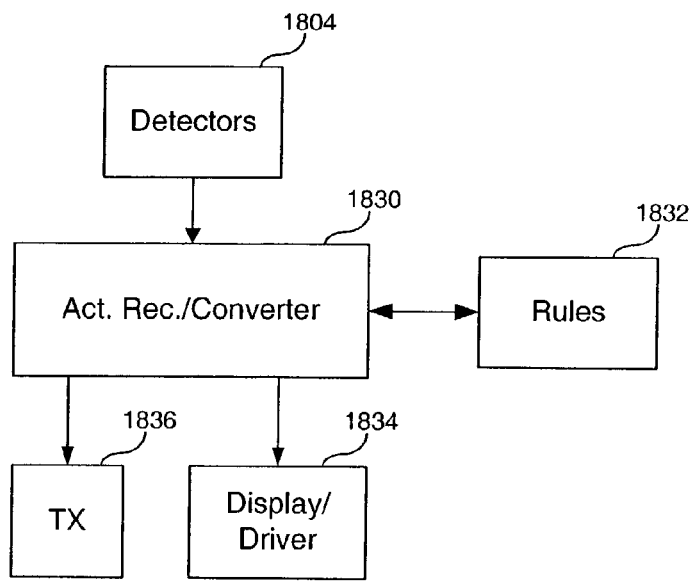

FIGS. 18A–C illustrate a system diagram, according to the present invention.

Figure 19:
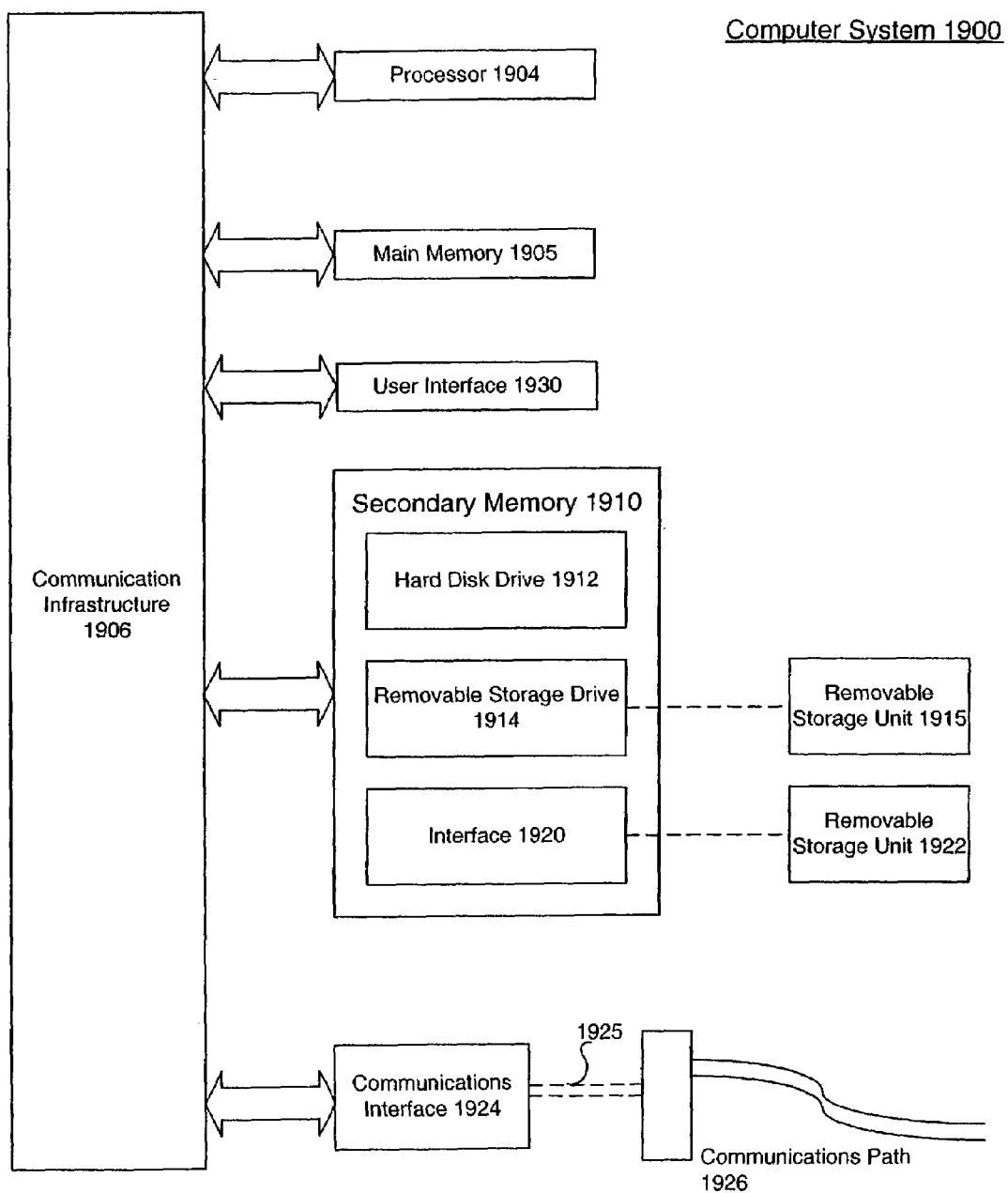

FIG. 19 illustrates an exemplary computer system for implementing the present invention.

FIG. 20 illustrates Twiddler's "Speed Tip" approach to text entry.

FIG. 21 illustrates the Twiddler2 Default chord guide, which requires linear look-up.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

Table of Contents

I. Definitions
II. Overview
   A. Gesture
   B. Gesture
   C. Gesture
III. Methodology
IV. Additional Input Detectors
V. Procedure
VI. Efficiency and Gestures
VII. Multiple Languages
   A. Korean Example
XIII. Accents
X. Activation Timing
XI. Hardware Implementations
XII. Incorporation in Other Devices
XIII. Example Implementations
   A. Example Hardware/Software/Firmware Implementations
   B. Example Computer Program Implementations
XIV. Example Computer Program Product Embodiment
XV. Conclusion A preferred embodiment of the present invention is now described with reference to the figures. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

I. Definitions

The term "key" is used throughout this description to refer to an input detector of a keyboard, or other device or system having input detectors that sense a user's desire to perform a recognizable activation. Input detectors are well know in the art of keyboards and other electrical devices. Input detectors produce an electrical signal that is recognizable by processing circuitry. In the case of electrical input detectors, normally open and normally closed varieties exist. Alternatively, the use of the term input detector herein also contemplates liquid crystal display (LCD) touch screens or pads, devices that use light of various wavelengths to detect movement of a finger, for example, pressure sensors and the like. Thus, the terms key and input detector are used interchangeably herein.

The term "activation" is used throughout this description to refer to the touching, pressing, pushing, or holding of an input detector so as to produce a recognizable output, result, action, signal, indication, etc.

A "digraph" comprises any two consecutive letters. For example, the word "the" comprises the digraph "th" followed by the letter "e", or the letter "t" followed by the digraph "he". A "trigraph" comprises any three consecutive letters, and so on.

II. Overview

A novel, multi-functional, single-hand interface for human-technology interaction is disclosed. Various embodiments of the invention integrate combinations and subcombinations of the following concepts:

Minimal keys;
Three basic gestures and their higher order sequences.;
Natural movement capabilities of the human hand;
Efficient mapping of complete written language systems;
A unique double level dynamic display;
"Eyes-free" input (visual monitoring not required;
Stationary hand position with one degree of freedom for each finger;
Universal mobile accessibility;
Limited physical and cognitive demands; and
Ambidextrousness.

The method of the present invention comprises selecting one or two keys out of five keys corresponding to the fingers of one hand. A single long gesture depressing one of the keys, causes a single character or command to be output to a receiving device. This single gesture needs to be held for a specific, constant duration before the output occurs. No error is caused by holding it longer. A second gesture comprising two sequential strokes of keys (either the same key or two different keys) will output another, different character. The first key push initiates a time period within which the second key push must occur or a timeout will occur and the first key push will not be registered. This means that the most effective timing is a rapid sequential movement, which ensures that the second key push occurs within the time period. Strings of sequential pushes can occur at a fluctuating speed according to subtle differences in timing caused by the difference in strength and control between fingers, as well as by cognitive and linguistic decision processes occurring concurrently A third type of gesture is possible that comprises a double sequential push merging with a push that is held longer. This combined gesture will output first the character associated with the fast gesture and then the character associated with the holding gesture. These three gestures are described in detail below.

Of great significance to the success and simplicity of this method is that both elements of the gestures maintain a one-to-one relationship to their corresponding output. In other words, a particular sequence of gestures always outputs a particular character, and this character only, from the active language set. No character has multiple movement patterns associated with it. The movement requirements are thus far simpler than those associated with the QWERTY keyboard or chord keyboards explained previously.

The relationship of the gestures required to the language being output is also of significance. The characters are mapped to the gestures according to statistical properties of alphabetic systems. It is usual to consider frequency of occurrence of individual letters as a determining factor in keyboard layout, as well as frequencies of digraphs in the language. The method described here allows for the third type of gesture—the combined fast and slow gestures—to output a high proportion of these digraphs ensuring a highly efficient ratio of keystrokes per character. Using published data it is possible to calculate that the average keystrokes per character (KSPC) provided by this method is approximately 1.45. This is extremely low in comparison to all other direct methods (i.e., methods in which additional characters are not output as a result of word completion software or other algorithmic help).

Of greater practical significance is the speed of output in a real situation. Counting keystrokes does not convey the true efficiency of a method when other factors such as changes in focus of attention (FOA), searching for keys, correcting errors, and cognitive processing time are considered. This method offers a simple, single-level activity comparable in its demands to normal handwriting. The simple phrase, "be home by nine" common to text messaging and used as the demonstration sentence for the Tegic Communications Corporation's T9® text input software, can easily be produced in under 10 seconds using the method of the present invention.

In addition to the natural and efficient method of input adopted here, a unique diagram enables the user to find and execute in real time the gesture required to input character s/he may have forgotten, or is unusual or less frequently accessed. The diagram can be dynamic and user controlled, or static and available in print form, enabling a variety of other functions to be presented. Numerals, accented characters, cursor keys, mouse commands, and keyboard functions and commands are immediately available. Other language diagrams can be selected by a few keystrokes. These languages could include all European scripts as well as Korean, Russian, Greek, Hebrew, etc.

The present invention exemplifies the concepts discussed above. In addition to entering data or text, the present invention can be adapted to execute commands to control other devices, or the like. The bulk of the following description explains the invention in terms of text entry, but the principles apply equally to use of the invention to perform other control functions as well, as would be apparent to a person skilled in the relevant art in light of this disclosure.

In the context of the above discussion this invention can be described as follows. Text can be entered by any one of three gestures of the fingers of one hand. Gestures can be viewed as groups of possible actions. As one learns the system of movements that distinctively coalesce into the required sequence for a word, these movements gain a holistic feel and become habitual and flow easily from the hand.

A. Gesture 1

This gesture represents a single action of each of finger that is held for a defined time duration. This produces a single text character. Five text characters can be produced from five fingers: One action corresponds to one character (1/1).

B. Gesture 2

This gesture represents sequences of two actions. The two consecutive movements result from: (a) a sequence of any two finger activations, or (b) one finger action repeated twice. This will produce a single text character: Two actions in sequence correspond to one character (2/1). Five fingers on five activators will produce twenty-five characters or outputs.

C. Gesture 3

This gesture represents sequences of two finger activations with the second activation being held beyond the defined time duration. This produces two characters: Two actions in sequence correspond to two characters (2/2). The twenty-five possibilities produce fifty characters or outputs.

III. Methodology

In an embodiment of the invention, these gestures are mapped to specific characters such as letters, according to the frequency of occurrence of letters and digraphs in the language being typed, to maximize the efficiency of production of text. The more frequent the digraph the more advantageous a position is given to the digraph letters, taking into consideration the physiological parameters associated with using particular fingers in combination with others. Two important parameters are the direction of movement from one finger to the next, and the selection of which fingers to use for each letter. Sequences moving from the little finger to the thumb are easiest and most natural. Combinations using the little finger and the ring finger are more difficult. There is an interplay between speed of input, the rhythmic variety of compounded gestures and the number of movements. Ideally, sequences of movements are created that can be discriminated from each other.

It is possible to put the least common letters on the longest push (Gesture 1), which would result in an increase in the proportion of Gesture 2 sequences, i.e., a word consisting of common letters. For example, the word "interesting" would be input with a continual even sequence of two-key letters. The number of movements required would be maximized and the discrimination (if calculated) would decrease. Thus, to achieve the best balance between variety, efficiency, speed and error rate, a delicate compromise is necessary. The inventor has endeavored to maximize gestures that create variety and efficiency rather than speed and error. This leads to the principle embodied in the selection of letters for fingers. The importance of defining this principle is to make decisions about text input in other languages. By what principle will the assigning of characters to finger gestures be arrived at? By a close examination of the statistics of a language, it will be possible to find the arrangement that maximizes the criteria necessary for easy input with this system.

Figure 1A:
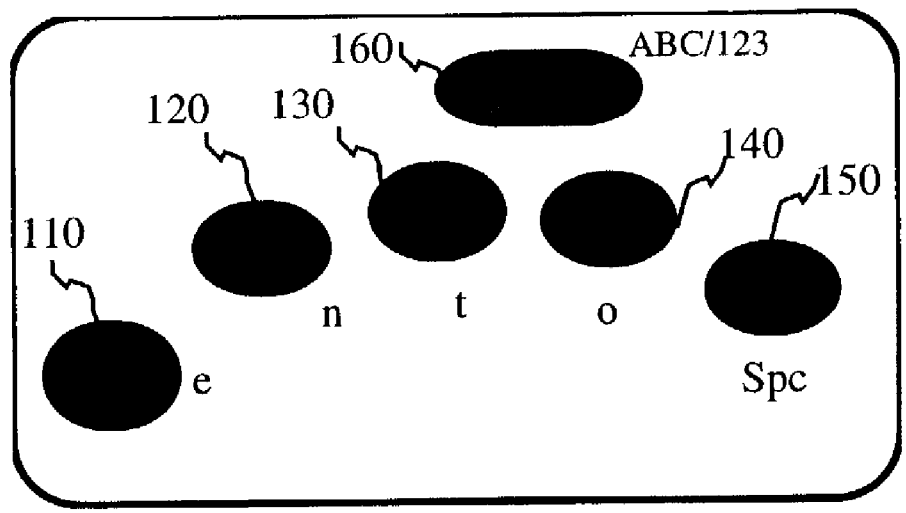
Figure 1B:
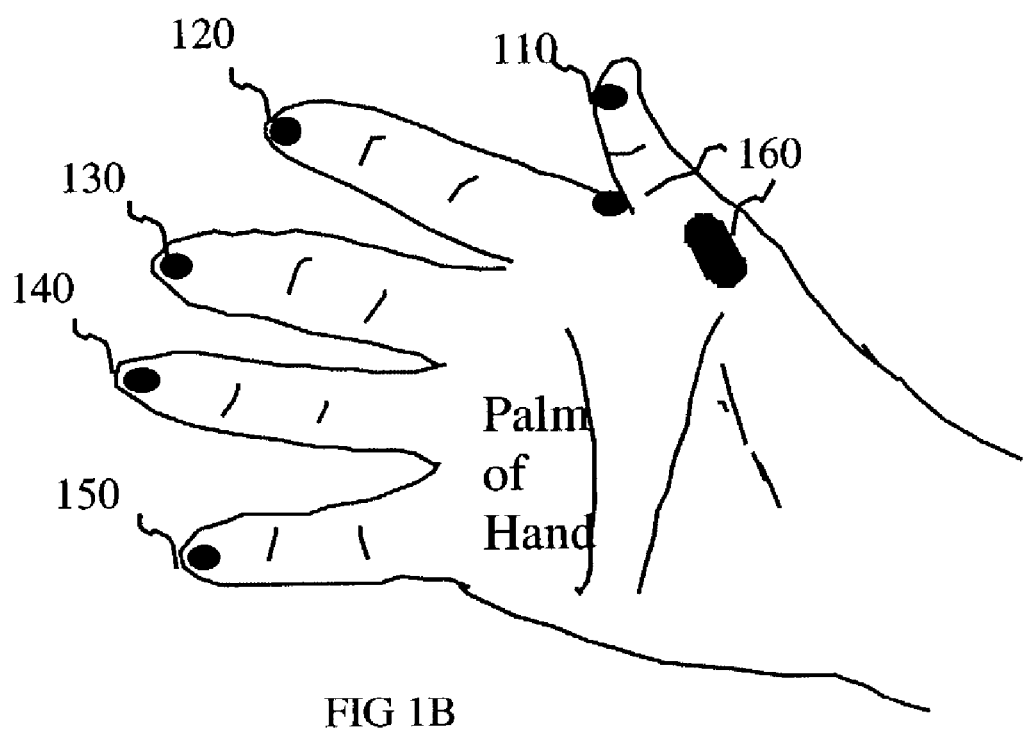

One embodiment of the system of the invention is shown as FIG. 1A and another as FIG. 1B. Such a device 100 can be used for one-handed input to a computer or other information processing device. Input detectors 110–150 (also called "keys" for simplicity) correspond to the characters e, n, t, o, and (space), respectively. For a right-handed user, the thumb operates the e key, the index finger operates the n key, etc. To express the letter o, for example, the user performs Gesture 1 with his or her fourth (i.e., ring) finger. Additional characters can be generated as described below by using additional keys, such as a key 160.

The error rate for inputting a Gesture 1 is very low. It involves a sustained key push that is voluntary. If a single short-duration key push contributed to the code for a character, the user would need to maintain extreme care with the device as any random touch would initiate a registration of the key push and would need to be corrected. A "timeout period" (described in detail below), which automatically cancels a single push not followed by another, reduces considerably the attentional demands of this method. Similarly, the Gesture 3 requires no overhead in timing or attention as the user can ignore the duration of the second push once the second character has been output. Some feedback, either auditory, kinesthetic or tactile, could be used during the early stages of learning to provide confirmation that the second character has been entered. The duration of the lag between activating the key and the generation of the output could be set at a convenient length for a novice user.

Gesture 2 does contain a more precise timing requirement. The second push must be released within the set time period (defined below as a "predetermined period"), or it will overlap into and convert to a Gesture 3 and input another character. The likelihood of this occurring is progressively lessened as some experience is gained. Activating the two key push as a unit, ending in an automatic release of the fingers from the keys, will circumvent this issue. It is also the most natural completion of a movement—one does not normally maintain the contact between the hammerhead and nail after the nail has been hit.

The present invention will allow for any number of groups of characters (of various languages) to be input. Each change of group would access another character set. This can be performed using a sixth key 160. In order to deal with memory demands it is essential to have a direct and immediate means of looking up the required sequence of movements for a character that is seldom used and not in the habitual sequence repertoire of movements. Most reduced keyboard devices—Bat keyboard, Twiddler Cykey, etc.,—provide tables of key definitions. These require a visual linear search up and down columns of data and/or graphic symbols (see FIG. 2I). This linear search is time consuming and inadequate for real time input.

A similar table representing outputs produced by the present method is presented below in Table 4. It is immediately apparent that these are not useful for real-time reference while engaged in using this method.

Our visual system contends with the simultaneous registration of events in the visual field. We are adept at using peripheral vision to reach for objects that are not directly focused on. The information required for functional use of this method must be retrievable without time consuming visual searching. The inventor's solution is a compact matrix that falls within the visual field of one glance and allows for recognition of a character without a lengthy search. Once found, the character's placement in the matrix informs the user of the required input gesture.

FIGS. 2A–L illustrate a diagram 200, according to an embodiment of the present invention. These diagrams represents a collection of five, five-by-one (5×1) rectangles (see FIG. 2B) depicting five input detectors, capable of being activated by a user with five fingers of a single hand. A stacked five-by-five (5×5) matrix (see FIG. 2A) represents the 25 codes (outputs) possible with any sequential activation of two keys, plus the five codes created by a single long duration activation of a key. These five codes are placed in the upper left (for example) of the diagonal cells from left lower to right upper corner (for right hand use). Any single short activation will output a null code. The codes in any row are related spatially to the corresponding gray diagonal cell. Sequential activations proceed from the left or right towards the grayed cell in that row. In a sense, each finger is the "home key" of a six character keyboard with sequential keystrokes beginning at an intended character position in the row and ending at the "home key" indicated by the grayed cell. The user will therefore adopt this simple rule: push the key of the character and then its home key.

The spatial arrangement of the codes also contains further information related to the second output resulting from holding one of the activated keys. In FIGS. 2A and 2H "i" results from sequential activation of middle and index fingers, but if the final key is held, as in lower half of FIG. 2J, this second output "n", relates to the horizontal gray key. FIG. 2K (lower) illustrates that "it" will result from the same sequence of middle and index fingers if the middle finger, or initial key, is held. Here output is related to the vertical grayed key in FIG. 2A corresponding to the home key of the middle finger. The power of this multi-dimensional diagram is its encapsulation of all possible outputs: all possible single activations and all sequential activations. The outputs are indicated by absolute and relative position in the diagram and the sequence of key activations by spatial distance from and direction to the "home key".

The importance of being able to access information in diagram 200 at a glance, using the natural simultaneous perception of objects in the field of vision, is that it ensures instantaneous search results for items not remembered or for items newly presented when the display changes in a dynamic manner. A change in the diagram caused by an activation of the sixth or subsequent key can be provided to the user on an active display screen (e.g., CRT, LCD, holographic projector, or the like) or a static medium (e.g., a printed card or pamphlet). The number of alternative outputs far exceeds practical time limits for a linear search of the same information presented in list form. After a short learning period reference to the diagram will not be necessary for effective use of this method for standard text input.

The arrangement of characters corresponding to each finger or sequence of finger actions is presented on the matrix-like display (i.e., diagram 200) indicating the selection of actions required for each of the 30 characters of a minimal alphabet, as illustrated at FIG. 2A. Each grouping of characters within a horizontal frame, or row comprising five cells, which represent the activations associated with each of the five fingers (see FIG. 2B). The shaded characters represent the finger towards which gestures are made. The thumb is the lowest row and the little finger is the upper row for a right-handed user. A horizontal mirror of the diagram would be used for a left-handed user. Thus, the diagonal shaded squares indicate the five fingers (see FIG. 2C).

FIG. 2A is a stem-and-leaf diagram with the stem shifted clockwise 45% (degrees). A conventional step and leaf diagram is illustrated in FIG. 2D. The central or "stem" (shaded) column 230, once rotated according to the present invention, comprises the five diagonal cells of the diagram in FIG. 2A. Stem cells represent the target of a sequential gesture, as well as long duration keys. The "leaves" in FIG. 2D represent the direction of movement, i.e., from left to the middle and from right to the middle, as illustrated by arrows 240 and 242, respectively. Thus, FIG. 2A comprises a "diagonalized" stem-and-leaf diagram. Of course, the number of cells in the stem-and-leaf diagram according to the present invention is a function of the number of input detectors implemented. A simple alphabet may not require as many detectors, while a more complicated alphabet may require more detectors. The present invention is not limited to the English alphabet, nor are the examples described herein.

Figure 3A:
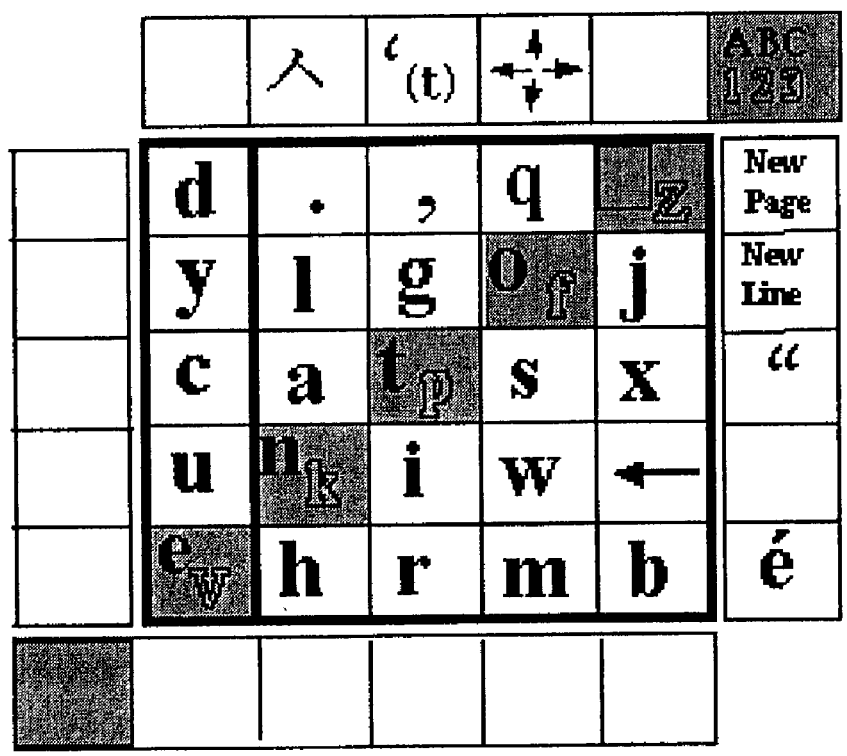
Figure 3B:
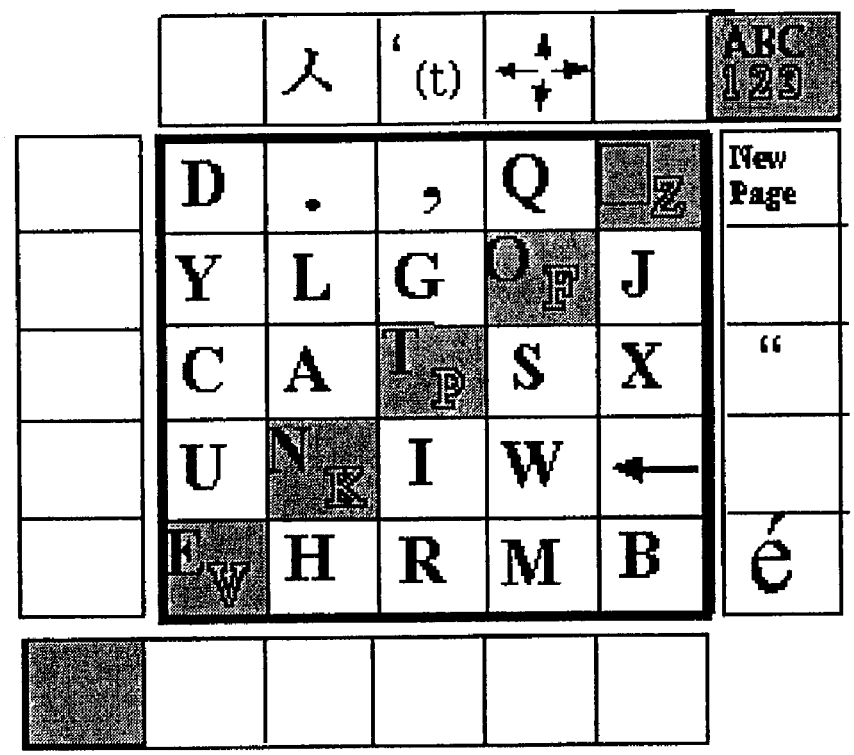
Figure 4A:
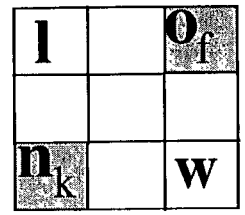
FIGS. 4A–4H represent digraphs corresponding to FIGS. 2 and 3, according to the present invention.
Figure 4B:
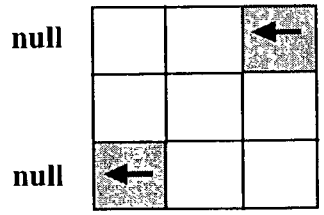
Figure 4F:
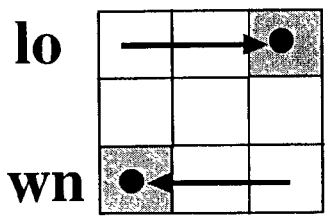
Figure 4C:
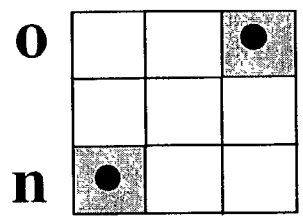
Figure 4G:
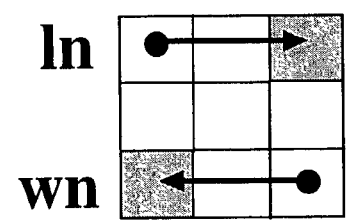
Figure 4D:
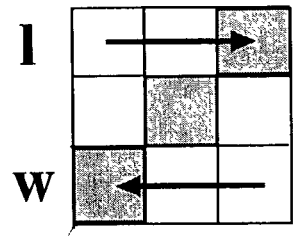
Figure 4H:
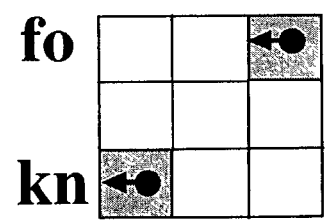
Figure 4E:
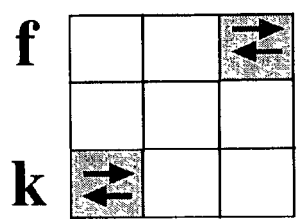
Figure 4E:

The sequences using an extra sixth key can be depicted in an L-shaped arrangement around the top and side of the diagram, as illustrated in FIGS. 3A and 3B. Sequences moving from the 5 finger keys to the extra key are placed above the diagram and sequences moving from the extra key are placed alongside (down movement), for example. This is described in greater detail below.

The following explanation relates to the English language. The same principles of selection and display construction will apply to any other language selected.

Gesture 1 (a single "long" duration action) creates characters indicated by the normal type-faced letters in the diagonal shaded cells: thumb=e; index=n; middle=t; ring=o; and little=space. See Table 1. Hence, to express the letter e in the illustrated embodiment, the user depresses the e key (i.e., the first input detector) with her thumb, and holds it for a predefined period or longer. Similarly, to express the letter n, the user depresses the n key (i.e., the second input detector) with her index finger, and holds it for the predefined period, and so on for the other fingers to perform the corresponding first gestures.

TABLE 1

| Little: | Space |
|---|---|
| Ring: | O |
| Middle: | T |
| Index: | N |
| Thumb: | E |

Gesture 2 represents a two-action sequence. Table 2 lists the gestures grouped according to the second finger of the sequence:

TABLE 2

| Little: | D, period, comma, q, z |
|---|---|
| Ring: | Y, l, g, f, j |
| Middle: | C, a, p, s, x |
| Index: | U, k, i, w, backspace |
| Thumb: | V, h, r, m, b |

To express one of these characters, two sequential keystrokes are necessary, where each is held for a shorter period than the predetermined period of Gesture 1. The timing of Gestures 1–3 is described below in connection with FIGS. 12–17. Referring again to FIG. 2, the keystrokes needed are given by the shaded keys in the row and column of the desired character. To express the letter "w", for example, the user presses two keys, the index finger key and the ring finger key. To express the letter "d", the user presses the thumb key and the little finger key. The order in which the two keystrokes are performed is determined by moving horizontally towards the shaded diagonal of FIG. 2. Therefore, the letter "w" requires pressing the index finger key first, followed by the ring finger key. Similarly, the letter "d" requires pressing the thumb key first, then the little finger key. Hence, for desired output depicted on cells above the shaded diagonal, motion flows towards the diagonal. In these examples (and for any unshaded characters in the upper left half of the diagram of FIG. 2) the left key of the pair is pressed first, followed by the right.

For a desired output depicted on cells below the shaded diagonal (i.e., characters in the lower right half of the diagram), the motion again flows towards the diagonal. Here, the right key of the required pair is pressed first, followed by the left key. The letter "m", for example, requires the ring finger and the thumb keys, since these are the keys in the row and column corresponding to the letter m in the diagram. Since motion flows horizontally towards the diagonal, the ring finger key is pressed first, followed by the thumb key.

Note that to generate the letter "v", for example, the thumb key is pressed twice. Likewise, the letter "k" is generated by pressing the index finger key twice. Similarly with "p", "f" and "z" each requiring a double press of a single finger. These characters are depicted in an outline font in the lower right of the diagonal squares.

Gesture 3 is an extension of Gesture 2. If, in a Gesture 2 action, the second finger is held to the duration of a Gesture 1 action, it will add the letter selected by the second finger. Thus, "h" can be produced by a Gesture 2 involving index followed by thumb. Hence "he" is produced by index followed by thumb, where the thumb is held for the predetermined time period. Table 3 lists exemplary digraphs that can be produced by Gesture 3 actions:

TABLE 3

| d-spc, period-spc, comma-spc, q-spc, z-spc |
| yo, lo, go, fo, jo |
| ct, at, pt, st, xt |
| un, kn, in, wn |
| ye, he, re, me, be |

The power of this method and system of text input lies in the natural manner these three basic gestures interact to produce consistent and predictable sequences of text. The variety of outputs stems from the inherent multiple possibilities resulting from combining sequences with alternative durations, i.e., in musical terms—notes and rhythms. We must recognize rhythm to be, not as a skill to master, but an essential and natural component of all movement.

Rhythm is the binding force that organizes disparate movements into a coherent whole. Movements in rhythm are easier and more controlled than individual unrelated actions. It is the multiple possibilities of sequential activations in different rhythms that create the multiple outputs possible in this system. The alphabetic outputs, resulting from using sequential activations of three fingers are illustrated in Table 4.

TABLE 4

| | | | | | | | | | |
|---|---|---|---|---|---|---|---|---|---|
| 12__3__ | | unt | 13__2__ | Ctn | 23__4__ | ato | 24__3__ | Iot |
| 1__2\3 | | ean | 1__3\2 | Eit | 2__3\4 | ngt | 2__4\3 | nso |
| 1\2 3__ | | uet | 1\3 2__ | Int | 2\3 4__ | ano | 2\4 3__ | Int |
| 2__1__3__ | | net | 2__3__1__ | nte | 3__2__4__ | tno | 3__4__2__ | otn |
| 2__13 | | nc | 2__31 | nr | 3__24 | tl | 3__42 | tw |
| 2__13__ | | nct | 2__31__ | nre | 3__24__ | tlo | 3__42__ | twn |
| 213__ | | ht | 231__ | ae | 324__ | io | 342__ | gn |
| 21__3__ | | het | 23__1__ | ate | 32__4__ | ino | 34__2__ | gon |
| 2__1\3 | | nce | 2__3\1 | nrt | 3__2\4 | tln | 3__2\4 | two |
| 2\1 3__ | | hnt | 2\3 1__ | ane | 3\2 4__ | ito | 3\4 2__ | gtn |
| 3__2__1__ | | tne | 3__1__2__ | ten | 4__2__3__ | ont | 4__3__2__ | otn |
| 3__21 | | th | 3__12 | tu | 4__23 | oa | 4__32 | on |
| 3__21__ | | the | 3__12__ | tun | 4__23__ | oat | 4__32__ | oin |
| 321__ | | ie | 312__ | rn | 423__ | wt | 432__ | sn |
| 32__1__ | | ine | 31__2__ | ren | 42__3__ | wnt | 43__2__ | stn |
| 3__2\1 | | thn | 3__1\2 | tue | 4__2\3 | oan | 4__3\2 | oit |
| 3\2 1__ | | ite | 3\1 2__ | rtn | 4\2 3__ | wot | 4\3 __2__ | son |

Thumb = 1   Index = 2   Middle = 3   Ring = 4   Little = 5
Underline (__) = long key duration
Backslash (\) between characters = hold first key while activating and releasing second key Only a representative sample of possibilities is presented for illustration purposes. The backslash between two finger numbers, e.g. 2\3, indicates that the second finger is held during and after the activation and release of the third finger.

Table 4 also illustrates the essential need for the Diagram of the character system included in this invention, as all of the information contained in Table 4 is also contained in diagram FIG. 2A, but there it is immediately accessible without laborious searching activity. Many of the entries in Table 4 are only meaningful if seen as internal components of words e.g., 2__13__="nct" occurs within "function". Some do not often occur in English, but the same sequence of activations could be appropriate to another language set or in typing numerals.

Figure 2E:
Figure 2D:
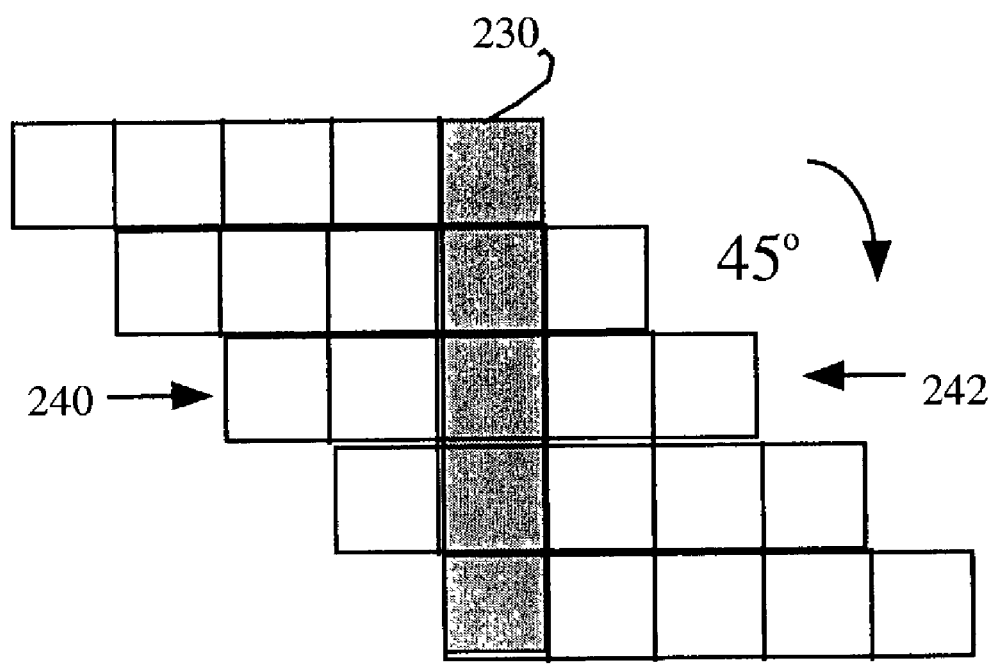

An exemplary digraph is illustrated in FIGS. 2E–L. The notation for a short duration activation is depicted with an arrow (→) and a long duration activation is depicted with a large dot (•). The 2×2 matrix visualizing the digraphs for the letters "n", "k", "t", "p", "a" and "i" is illustrated in FIG. 2E. Preferably, these diagrams are output using index finger and the middle finger to activate two adjacent input detectors (see input detectors 120 and 130 of FIG. 1, for example).

FIG. 2F illustrates two separate, non-sequential short duration activations of the "n" and "t" keys. A short activation with the index finger on input detector 120 (the "n" key) produces no output, which is depicted as "null" in the figure.

Similarly, a short activation with the middle finger on input detector 130 (the "t" key) produces no output.

FIG. 2G illustrates Gesture 1 (i.e., two separate, non-sequential long duration activations). A long activation with the index finger on input detector 120 produces the letter "n" and a long activation with the middle finger on input detector 130 produces the letter "t".

FIG. 2H illustrates a first instance of Gesture 2 (i.e., short, sequential activations of the input detectors 120 and 130). A first short activation of input detector 120 followed by a short activation of the input detector 130 outputs letter "a", while the reverse short activation of those detectors outputs the letter "i".

FIG. 2I illustrates a second instance of Gesture 2 (i.e., repeated short activations of the input detectors 120 and 130). Two short activations of input detector 120 outputs the letter "k" and two short activations of the input detector 130 outputs letter "p".

FIGS. 2J, 2K, and 2L illustrates Gesture 3 (short followed by long sequential activation of the input detectors 120 and 130). FIG. 2J illustrated a first short activation of input detector 120 followed by a long activation of the input detector 130, which outputs letters "at". The reverse short-long activation produces the letters "in".

FIG. 2K illustrates a first long activation of input detector 120 followed by a short activation of the input detector 130, which outputs letters "an". The reverse long-short activation produces the letters "it". In each case the first finger is held while the second finger activates and releases its key.

Finally, FIG. 2L illustrates a first long activation of input detector 120 followed by a short activation of the same input detector, which outputs letters "pt". The same short-long activations of input detector 130 produces the letters "kn".

Another exemplary digraph for the six letters "n", "k", "o", "f", "l" and "w" is illustrated in FIGS. 4A–H. The same gestures described in connection with FIGS. 2E–L are used on the input detectors 120 and 140 in this case to produce the following outputs: null, null, o, n, l, w, f, k, ln, wn, lo, wn, fo and kn, as illustrated in FIGS. 4A–H, respectively.

Figure 5:
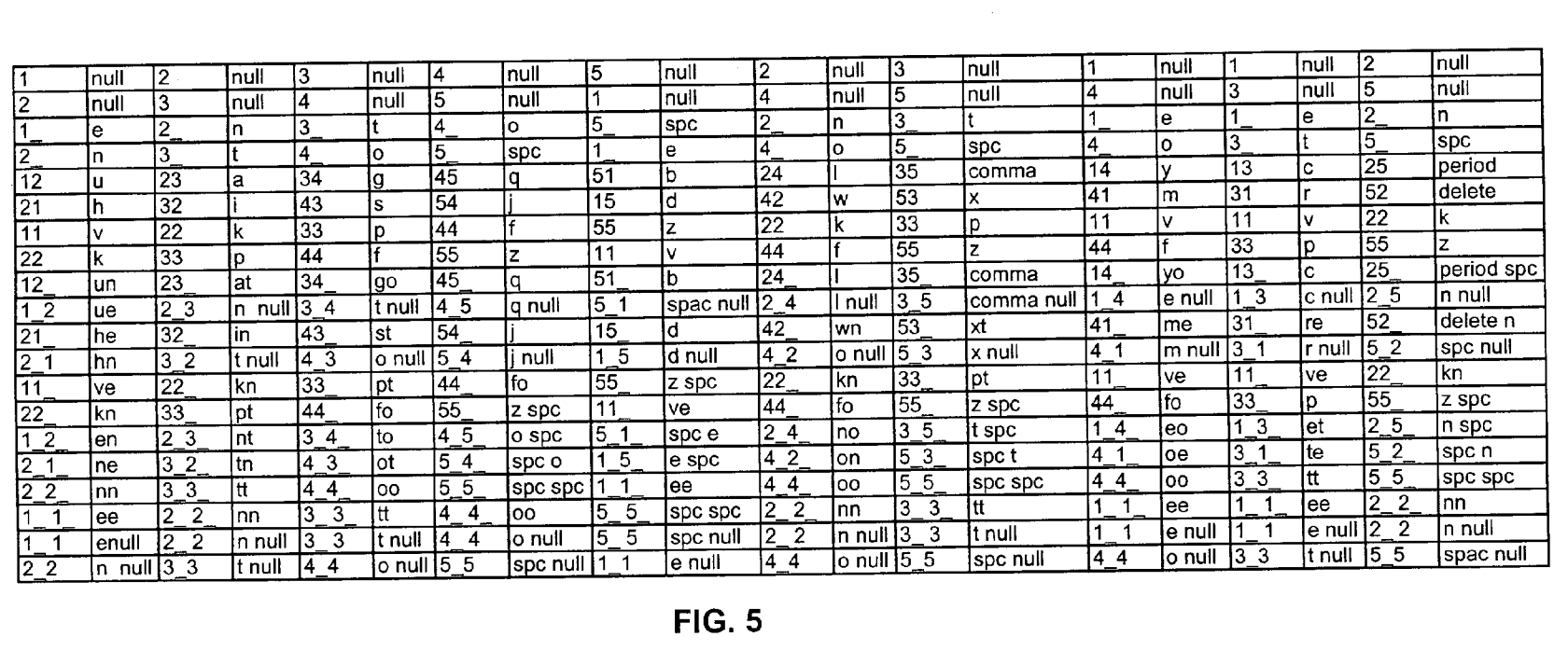

A table of all possible outputs of the exemplary diagram in FIG. 2A is illustrated in FIG. 5. In this figure, an underline ("__") represents a long duration activation and a number not followed by an underline represents a short activation. Table 5 gives examples of multiple sequences of concatenated gestures and their outputs. The number of characters in a word and the number of key activations are provided to give some insight into the ease and efficiency of this method. Calculating the character/keys ratio here is for illustrative purposes.

TABLE 5

| (C)har | (K)eys | C:K | (C)har | (K)eys | C:K |
|---|---|---|---|---|---|
| he | 21__ | 2:02 | before | 51__44__31__ | 6:06 |
| re | 31__ | 2:02 | interesting | 32__3__1__31__43__32__34 | 10:12 |
| the | 3__21__ | 3:03 | remember | 31__41__41 51__31 | 8:10 |
| here | 21__31— | 4:04 | young | 14__12__34 | 6:06 |
| there | 3__21__31 | 5:05 | information | 32__44__314123__324__2__ | 11:14 |
| where | 4221__31— | 5:06 | rainforest | 312332__44__31__43__ | 10:12 |
| ich | 321 321 | 3:06 | | | |
| which | 4221321 321 | 5:10 | into | 32__3__4__ | 4:05 |
| sh | 4321 | 2:04 | understand(sp) | 12__1\53143__2\315__ | 11:12 |
| she | 4321__ | 3:04 | | | |
| shine | 4321 32__1__ | 5:07 | be (sp)home (sp) | 51__5__214__41__5__ | 8:09 |

TABLE 5-continued

| (C)har | (K)eys | C:K | (C)har | (K)eys | C:K |
|---|---|---|---|---|---|
| ing | 32__34 | 3:04 | by(sp) nine | 51145__2__32__1__ | 7:09 |
| ring | 3132__34 | 4:06 | | | |
| bring | 5131 32__34 | 5:08 | | | |
| going | 34__32__34 | 5:06 | | | |
| | | | | 137:172 = 1.26 KSPC | |

Level one (beginner) text production would concatenate combinations of gestural sequences to produce letters and words.

Level two (intermediate) would chunk or group familiar (high frequency) gestures into larger gestures e.g. t-he, an-d-space, in-g etc Level three (advanced) would chunk words into their constituent efficient gestures, e.g., be-fo-re.

Level three (advanced) would chunk words into one efficient gesture, e.g., be-fo-re.

To ensure reliable input a single action not followed by a second action within a defined time period will timeout and be ignored. This timeout period can be user-set to correspond to the learning level and expertise of the user.

The duration of the Gesture 1 action as well as the duration of the held second action of a Gesture 2 is also user definable according to level of expertise.

Because Gesture 2 actions need not be held (two consecutive relatively brief actions), these actions can be produced as fast as the user wants, irrespective of the duration of Gesture 1 actions. Strings of Gesture 2 actions can proceed at significant speed. The faster they go, the less likelihood there is that a single action will timeout. Because the Gesture 1 action has a fixed, known, time duration, this only allows for intentional actions to be registered. In an embodiment of the invention, the completion of the Gesture 1 actions can be signaled by additional feedback, (auditory sound or tactile stimulus), indicating to the user the end of the defined duration and the moment of character input, if the user is not visually monitoring character output. This indicates the moment for release of the held key.

Any key used in a sequence of one or more consecutive instances of Gesture 2 can be held for a duration beyond the predetermined period. This results in a final character of the sequence that corresponds to the held key. For example, given one instance of Gesture 2, such as the one producing the letter "i", the first key (middle finger) can be held. Assuming that the action of the index finger is suitably brief (shorter than the predetermined period), the letter "t" is generated after the letter "i", since the middle finger has been held. This can be extended to additional consecutive instances of Gesture 2. The digraph "sh", for example, requires two instances of Gesture 2, and a total of four keys. The first of these is the ring finger. If that key is held throughout the sequence, and if the other three actions are sufficiently brief, the letter "o" will be generated after the "sh" digraph, yielding the trigraph "sho". This concept can be extended to any sequence of two instances of Gesture 2.

IV. Additional Input Detectors

In a preferred embodiment of the invention, a sixth input detector is present (see input detector 160 in FIG. 1). The corresponding diagram is shown in FIGS. 3A and 3B. Sequences moving from the five-finger input detectors to the extra input detector are placed above the diagram and sequences moving from the extra input detector are placed alongside The physical position of the extra input detector in spatial relation to the five input detectors under the fingers is of great importance. It is critical that repositioning of the hand is not introduced. If the extra input detector was assigned to the thumb or little finger there is a possibility that in reaching for this input detector from a position above the input detectors that the hand would be displaced laterally and introduce targeting issues into the use of this method. The position of the sixth input detector is therefore within the span of the hand as defined by the position of the thumb and little finger. This extra input detector can lie above or below the line of the five fingers, and is elongated in parallel with the line of the fingers to allow for access by either the middle or ring fingers. (The line of the fingers constitutes the x-axis and the extra input detector being displaced along the y-axis. "Above" and "below" do not refer to a displacement on the z-axis.)

FIG. 6 illustrates an embodiment in which the sixth input detector 160 is located above the middle and ring fingers. FIG. 7 illustrates an embodiment in which the sixth input detector 160 is located below the middle and ring fingers. Alternatively, the layout of input detectors in FIG. 7 represents a seven-detector embodiment with the addition of detector 702. FIG. 8 illustrates an exemplary four input detector embodiment. The present invention can implement a minimal alphabet or set of commands using as few as two input detectors. More than seven input detectors are also envisioned, as would be apparent to a person having ordinary skill in the art based on the disclosure herein, without departing from the spirit and scope of the present invention.

FIG. 1B illustrates input detectors coupled to the fingers of one hand. One small pressure sensitive switch is placed on each fingertip (five detectors 111–115). An additional pressure sensitive switch can be placed further along a selected finger (detector 116), which is activated when the finger is extended (corresponding to the gesture required for activating the sixth key 160 in FIG. 1A). It is apparent that this invention could function without an external device or keypad. The user could apply the method of this invention on any available surface, in any orientation of the hand. The technology required is well known and of extreme simplicity compared to recently developed systems attempting to achieve typing without external keyboards, requiring laser, infrared and 3D positional technologies.

Extra input detectors make additional sequential activations possible. When a sixth input detector is added a single Gesture 1, eleven Gesture 2, and ten Gesture 3 sequences become available. In an embodiment of the invention, because capitalization is frequent, a capitalization function is assigned to Gesture 1 on the extra input detector. Here, one gesture changes the succeeding letter to an uppercase and automatically reverts back to lowercase for the following letter. "Caps Lock" function can be achieved by two Gesture 1 activations of the extra input detector in succession, without an intervening gesture of another type. The subsequent Gesture 1 on the extra input detector will toggle the Caps Lock off and revert to lowercase. Whenever uppercase is activated, the display will change to uppercase characters to provide visual confirmation or feedback of this change. An auditory or tactile stimulus could also accompany this action.

Additional characters can be made available to the user through use of the sixth input detector. As illustrated in FIG. 9, the display presenting numerals and other characters, appears when accessed by a double activation of the extra input detector. Numbers 0 to 9 are arranged to provide some symmetry in relation to the fingers. Zero (0) is on the diagonal cell corresponding to sustained activation of the input detector for the thumb, and numbers 1, 2, and 3 are on the diagonal cells associated with a sustained activation of the input detectors for the index, middle and ring fingers, respectively. Index, middle and ring fingers also access 4, 5, and 6 by a sequence ending on the extra input detector, and 7, 8, and 9 use the same fingers but starting the sequence on the extra input detector. There is some similarity here, to the assignment of fingers on the standard numeric keypad of a computer.

The process of text input involves more than access to alphanumeric characters alone. Additional characters for punctuation (period, comma, apostrophe, colon, etc.) often occur more frequently than low frequency characters such as "k" or "x". Editing keys (backspace, down, up, etc.) and command keys (return, control, escape, etc.) are commonly used. For example, it is essential for English text production to use the apostrophe to indicate the possessive (e.g., John's) and in abbreviations (it's, don't, can't). If the apostrophe is accessed by a sequence involving the sixth key and the middle finger (see FIG. 3), then a sequential press of the sixth key and a sustained press of the middle finger would output "'t" (apostrophe and letter "t") with an efficient two key pushes for two characters.

Other sequences involving the sixth key allow for access to numerous other displays including accents (FIGS. 11C and 11D), page navigation commands (FIG. 11E) and other languages (e.g., Korean FIG. 11A, 11B and 11F). None of these additional displays or character sets introduce a new principle of coding or method of access in this invention. Adding additional sets of characters for other languages or functions e.g. a scientific calculator, or vocabulary items for a particular programming language for example, does not require learning new or additional movement sequences. The same sequences are redefined to map to the new items and can be read from the display in the same manner. A similar situation exists on computer keyboards which have alternative character sets available. Other cells assignment/ arrangements are envisioned as would be apparent to a person having ordinary skill in the art based on the disclosure herein, without departing for the spirit and scope of the invention. Furthermore, innumerable other displays can be made available, as one sequence could provide the option to choose from a further 30 displays and so on.

In summary, additional keys can be placed within the span of the hand allowing for access to a wide range of outputs encompassing other character sets, languages and functions.

V. Procedure

This section explores an example procedure for assigning codes to the cells of a diagram, according to the present invention. One approach is to begin by examining a table of probabilities (for instance, using data from D. Hughes et al., "Empirical bi-action tables: A tool for the evaluation and optimization of text input systems. Application I: Stylus keyboards" Human-Computer Interaction, 17, (2002), (see Table 1), Lawrence Erlbaum Associates, Inc. Hughes et al. and extract the letters occurring most following others (i.e., those letters that have the highest probability of being the second letter of a digraph). These letters allow for the most variety of preceding letters and thus provide the greatest choice of placement of characters to ensure a high number of digraphs being produced. The decision process involved is complex, taking into account simultaneously active variables of finger strength and sequence ease, digraph probability, multiple digraph intersections on single keys, and higher orders of trigraph preferences. For every digraph produced a keystroke is saved. As well, important reductions in complexity of movement and cognitive decision processes occur. An extensive trial and error discovery process was involved in arriving at a suitable solution. Four of the highest accessed letters are assigned to the cells of the diagram diagonal (the long keys). The "space" code would best be activated by the little finger (as "space" occurs approximately 1/20 of all letters in the English language), and would as a result, only require a simple movement uncoordinated with the other fingers. Thus, the proportion of use of the little finger is balanced, but without requiring difficult, complex interactions with the other fingers.

A tally of the frequency of occurrence in the Hughes et al. combined data, (their Table 1), reveals that of 9,626,115 characters, 4,662,457 would be created by a single keystroke. Of the remaining characters, 1,559,201 would require one keystroke, and 3,404,497 characters would require 6,808,994 keystrokes (two each). As a result, a total count of 13,030,642 keystrokes would produce 9,626,155 characters with a ratio of 1.35 KSPC, according to the present invention.

The principle of use and of mapping letters to gestures, employed in this method, remains the same regardless of future applications of mathematical techniques, which would likely increase the efficiency of this method. Although the present layout in FIG. 2 already achieves an average of 1.35 keystrokes per character, it is expected that some improvement is possible, without departing from the spirit and scope of the present invention. Generally, the KSPC will fluctuate according to the level of text being produced. I. Scott MacKenzie, presents a corpus representing a standard set of phrases for use in evaluating text input efficiency. (See MacKenzie's Internet publication: "A Note on Phrase Sets for Evaluating Text Entry Techniques at "http://www.y-orku.ca/mack/RN-PhraseSet.html, Posted 17 May 2001, Updated 18 Apr. 2002.) Using this corpus (having a total of 14310 characters and 1995 digraphs), the layout of diagram 200 of the present invention achieves a KSPC of 1.4. Based on the inventor's empirical analysis, the average KSPC for the present invention is about 1.45 for English.

Overall efficiency of character output is increased if the likelihood of digraphs being produced is higher. Overall efficiency depends on balancing the high frequency letters (which if placed on long duration gestures would increase time taken to input) with the keystrokes per character (KSPC) count. If, for instance, the opposite strategy was adopted and the high frequency letters were assigned to the Gesture 2 activations, then they would have two keystrokes per character and the ratio of keystrokes per character would approach 2 (i.e., most letters requiring 2 strokes). This is ergonomically the most demanding arrangement involving the most work. The presented illustrative arrangements in FIGS. 2A, 9, 11A, 11B, 11C, 11D, for example, were arrived at through a process of trial and error. The average KSPC for simple alphabetic input is 1.45. Input for additional characters, numerals, accented characters and editing keys are also highly efficient.

VI. Efficiency and Gestures

The issue of efficiency is confused by the assumption that keystrokes are equivalent to activations. In a writing task we consider each letter to be equal to one character input and do not count the number of sub-strokes to make the letter (e.g., "T" has two strokes, "H" has three, while "K" has three strokes of varying orientation, etc.). These differences are combined and hidden in the concept of character, which here is equivalent to gesture. Similarly in examining this system of input, if we count gestures and not individual key activations, then the efficiency is much greater as some gestures will output 2 or 3 characters. A sequence of letters "ich" can be produced by a single gesture consisting of a concatenated sequence of activations of middle-index-thumb-middle-index-thumb (321321) executed at maximum speed. The physical movements could take a specific time but the cognitive overload is minimized to one decision process. The reduction in complexity of decision processes, as well as the speed of input improves efficiency.

VII. Multiple Languages

The use of this invention extends to multiple languages. Each language would require its own layout based on the characteristics of the language. Other implementations of this invention that allow for a less efficient arrangement of letters may also be desired. Averaging-out the digraph probabilities of a family of related languages, e.g., English, French and German or Spanish, Italian and Portuguese, can allow for one arrangement of letters to be used by the combined population of the speakers of these groups of languages. Thus, the first group would cover Germany 83 million, France 60 million and UK 60 million, USA 278 million for a combined population of 481 million (excluding speakers outside these countries). The second group Italian 58 million, Spanish 332 million, Portuguese 170 million for a combined population of 560 million. Similarly with Russian, etc., or other language families.

A user constructing text in English can with one gesture, insert text in any number of alternative scripts, e.g., Korean, however unfamiliar or unpracticed they are in using these scripts. Knowing the principle that relates gestures to letters presented in the diagram is all that is necessary.

This invention is not restricted to mobile devices but could function as an efficient alternative to the QWERTY keyboard, not requiring the space, cost or need for an external CPU and display for use. The potential user base would include the greater proportion of the world's population unable to economically access modem technology and the information explosion of the 21st century.

In summary, while a specific mapping of letters and keys is shown in the embodiments above, alternative mappings are also feasible. As described, the illustrated arrangement was chosen on the basis of ease of use but is not intended to limit the scope of the invention. Other arrangements can also be used. In one embodiment, the illustrated arrangement of letters can be reversed, so that the five (or six) keys run from the upper left to lower right, with the thumb key still mapped to the letter "e", etc. This allows for left-handed operation. The gestures and character output for the two hands would mirror each other.

Moreover, the gestures can alternatively be mapped to functions or executable commands, in addition to or instead of characters. The gestures could correspond, for example, to the functions of a scientific or business calculator, such as addition, subtraction, multiplication, division, exponentiation, and trigonometric functions. Common consumer electronic remote control functions can also be implemented. In general, the invention can be adapted to any device that requires human input of data and/or commands.

A. Korean Example

The importance and relevance of diagram layout becomes more apparent when considering other writing systems. An exemplary diagonalized stem-and-leaf diagram for implementing a Korean character set according to the present invention is illustrated in FIGS. 11A and 11B.

Korean constructs a graphic character (Hangul) by combining individual phonemic symbols representing sounds of the language (Jamo) into a composite character arranged within an imaginary rectangle. The combining rules are well described and allow for six different arrangements. Each Hangul must consist of a leading consonant followed by a vowel and ending with an optional final consonant. A null consonant is placed in syllables beginning with a vowel, in order to comply with the previous rule. Thus, a Hangul character represents a syllable. Two keyboards have been developed, termed 2-set keyboard array (also known as the KS array) and 3-set keyboard array. The 2-set system uses the same keystroke to represent initial and final consonants written with the same Jamo, although the sound represented is different. An analogy is the use of "ng" to represent a nasalized velar consonant in English as well as two other sounds "n" and "g". Some sounds are represented by a double Jamo symbol, but activated by two consecutive keystrokes of the same key. The 3-set system has an individual key associated with each of the initial consonants, final consonants, and vowels. Complex vowels are input with double strokes and complex consonants with shifted keys.

It is possible to access all 67 characters as well as any number of archaic characters using the present invention. It also functions using an 8-bit font but can create all 11,720 possible Hangul characters. A system of gestures that mirrors the tripart structure of Korean Hangul, assigning initial consonants to gestures proceeding towards the thumb, vowels on long gestures and final consonants on gestures proceeding towards the little finger is illustrated in FIG. 11A and FIG. 11B. This achieves a one-to-one correspondence between gestures and characters (Jamo) including complex consonants and vowels, and avoids the use of conversion software. A simpler solution is possible that uses a 2-set character array but would rely on conversion software to compile the final Hangul character from the individual, but ambiguous, Jamo.

There is no single-hand method of Korean text input available. Mobile phones use a Multitap method that is inefficient or word prediction methods, such as T9®, requiring visual monitoring and high cognitive overheads. The present method produces a seamless integration of Korean, English, other languages (e.g, Russian), numerals and commands, as well as all accented characters, allowing for the input of any other language that uses Roman characters.

The Mobile technology export industry in Korea is presently worth US$4 billion a year. This invention is a novel solution to text input in Korean which appears outside the present known realm of exploration.

XIII. Accents

A typical mobile phone uses a multi-tap system to type accented characters. To type these using a mobile cellular phone, for example, requires repeated pushing of keys as illustrated in FIGS. 11C and D. It is apparent that to type a Portuguese word containing ç would necessitate pushing the 2 key thirteen times. Even the é common in French, requires seven activations of the 3 key. In "A New Input Technique for Accented Letters in Alphabetical Scripts" (20th International Unicode Conference, Washington, D.C., USA, January 2002 [http://www.mpi-sb.mpg.de/~uwe/paper/AccInput-bibl.html], Uwe Waldmann states that: "Input methods for accented letters in alphabetical scripts should satisfy a number of (not fully compatible) requirements. In particular, they should be easy to learn and to memorize, they should induce little mental and physical stress, and they should make a large number of characters accessible using few dedicated keys and short key sequences."

Waldman employs a method in which a key activates accented versions of the character lying before the cursor. The sequence of characters available with each successive press of the accent key is statistically ordered in frequency of occurrence, for the specific language the keyboard is set to. On average, close to two keystrokes per accented character are required for input. But each language has its own system of keystrokes for gaining access to accented characters.

The technique employed in the present invention allows for all accented characters to be uniformly available with a maximum of two gestures, involving a double keystroke to change to the accent character set, and one or two keystrokes to output the selected accented character. The display in FIG. 11C, would function for all Roman languages and users could access these characters in a similar way even when changing from one language to another. It is unnecessary to input a character and subsequently alter it. This feature adds an additional level of efficiency and usability to this invention.

X. Activation Timing

Gestures 1–3 according to the present invention will now be described in connection with FIGS. 12–17.

Figure 12:
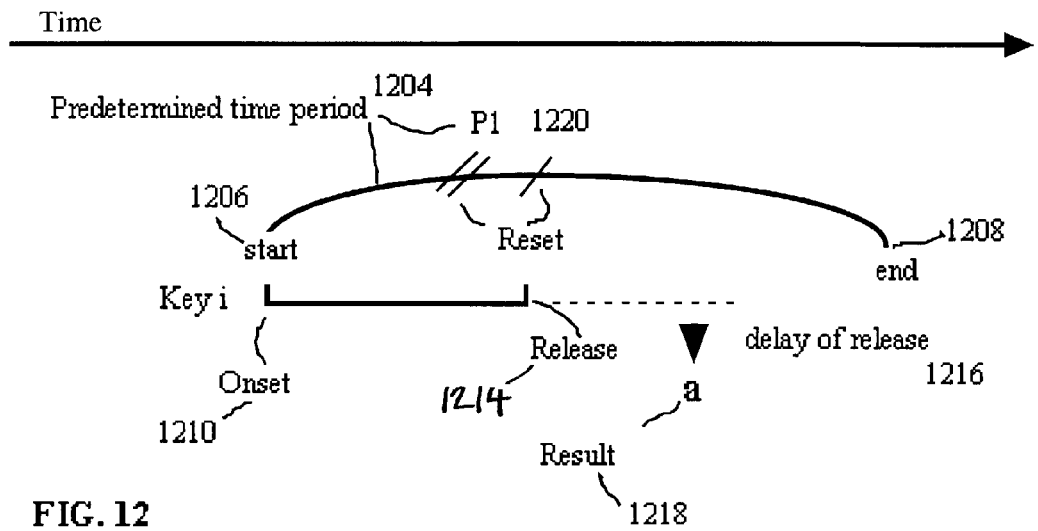

FIG. 12 illustrates a detector (also called a "key") used to describe the individual elements of the diagrams illustrated in FIGS. 13–15. As shown in FIG. 12, a time line 1202 indicates that the timing of events move from left to right across the figures. A predetermined time period is illustrated at 1204. The predetermined time period 1204 is illustrated as an arched line having a starting point 1206 and an ending point 1208. Onset or activation of a first key ("key i") is generally illustrated at 1210. Release or deactivation of the key occurs at mark 1214. A continued activation or delay of release is illustrated by dashed lines 1216. Output of a result is illustrated by triangle 1218. A single reset condition is illustrated by a single forward slash 1220. A double reset condition is illustrated by double forward slashes 1222.

Two types of counters are in progress continuously. Counters "k1" to "k6" calculate how long each key is activated. A counter "timeout" calculates the time between sequential key activations. If timeout exceeds a value "$t_{out}$", then timeout automatically goes to zero and all counters are set to zero.

Furthermore, resets are initiated by four events. The first event is the activation of a key (1212 of FIG. 12). This resets counters k1 to k6 and counter timeout. If the event also signals a sequential activation occurring within the predetermined period, then this triggers an appropriate result (also called an "output") "a" (1218). The second event is the ending of an activation (1214). This only resets one of Counters k1 to k6, (determining the duration the key was held) but the timeout counter continues to accumulate (1220 of FIG. 12). The third event, resulting from a held key's duration exceeding a predetermined period, causes an output a to occur (1218) as well as resets of both one of counters k1 to k6 and the timeout counter. A fourth event is when the timeout counter exceeds a predetermined setting tout because no other key was sequentially activated. (see 1314 in FIG. 13A, described below).

The timing relationship between gestures is ergonomically of great significance for the success of this invention. The critical factor in high speed coordinated action (as in piano playing or typing) is consistent feedback and consistent timing relationship between actions and results. A particular difficulty is the factor of "lag" when a result of an action is delayed. A delay in auditory feedback while speaking creates havoc with speech coordination and can cause a complete breakdown in the forward flow of speech. Experiments have shown that lag in the region of 20 ms (milliseconds) is considered acceptable to users in typing activities. In this invention, the delay between activating a key and the appearance of a character output for a long held gesture is recommended at 20 ms. This gives the user the feel of a direct result from the long gesture. Because two sequential key pushes resulting from the involvement of two fingers in concurrent overlapping motion could occur at a minimal interval, even approximating 1 ms, it will always be possible to perform this within a predetermined period set to 20 ms. The problematic timing relationship arises with a sequential input using a single finger. Here, there is no concurrent movement occurring, but a full cycle of activation and release followed by another full cycle of action and release. In order to assure that these two cycles are capable of errorless use without having to lengthen the predetermined period affecting the long key push (and thus increase the lag effect), an alternative solution is necessary.

The solution is to set the predetermined period tout to double the length of "kt" the period a key is held to activate an output. This full time period is only used if the first key activation ends before the activation of the second key, as then there is no reset of $t_{out}$ with release of a key, only a reset of k1 to k6. This solution gives the user double the time to perform a sequential movement with one finger and the length of the held gesture is unaffected. This solution contributes greatly to the sense of unlimited speed of input achieved by this invention.

Figure 13A:
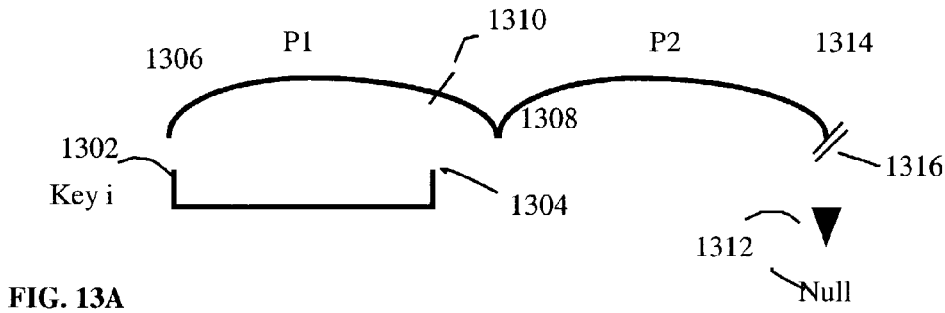

The FIG. 13A illustrates activation of "Key i". In this example, the activation begins at 1302 and ends at 1304. At the time 1302 a first predetermined time period begins, as illustrated at 1306. The first predetermined period ends at 1308. Because the end of the activation at 1304 is prior to the end of the first predetermined period 1308, a reset of one of k1 to k6 occurs, as shown at 1310. Generation of this reset condition still allows the counter $t_{out}$ to continue until the predetermined period ends at 1314. As explained above, this second predetermined period represents the second half of the duration of the counter $t_{out}$, which continues to accumulate when no other key is activated within P1 period. Because no other key is activated during this predetermined period, no output is produced. The production of a null output is illustrated in this figure by the triangle 1312 labeled "Null". At this point a double reset occurs (1314). Thus, a short activation, otherwise referred to as an activation that does not last beyond a predetermined period which is not followed by another short or long activation results in a null condition and generates no output.

Figure 13B:
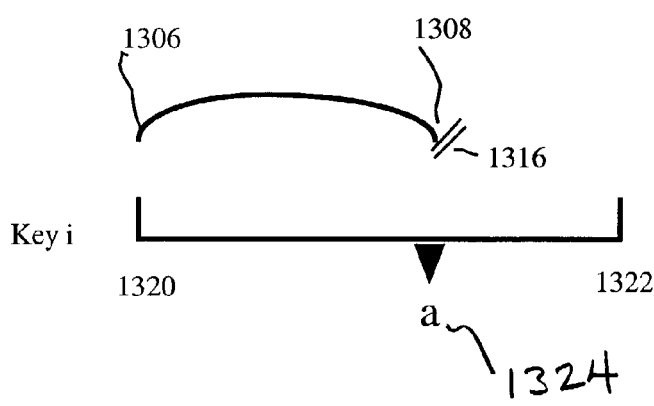

FIG. 13B illustrates the timing of a first gesture in connection with the present invention. Key i is activated at a time 1320, which begins a first predetermined period at a time 1306. The activation ends at a time 1322, which is after the end 1308 of the first predetermined period. Thus, a single output "a" is generated (1324). A single reset occurs at time 1316. A single activation that generates a single output is also referred to as a "long" activation. For example, referring to FIGS. 13B, 1A and 2A, an activation of input detector 110 beyond the end 1308 of the predetermined period will output the letter "e". Similarly, activating input detector 150 for the predetermined period will output a space. The duration of key activation after 1308 is non-significant and allows for an untimed release of the key, not requiring specific attention from the user. This gesture depends on the development of a "sense" of the length of the predetermined period.

Most individuals from an early age are capable of clapping in time to a constant rhythm. This is the natural ability that underlies this "sense". The particular period of time that elapses before an output is generated remains constant throughout the use of this method. It can be altered by the user but does not fluctuate once reset to a new setting. The output occurs a specific time duration after the key is activated and is therefore not coincident with movement of a finger but with the continued depression of a key for a specific time duration. The relation of key activation and resultant output is one-to-one. A single keypush creates a single output. Furthermore, only this finger and only this gesture are associated with this particular output, within the active language set.

FIGS. 14A–14D illustrate the timing of a second gesture in connection with the present invention. According to the present invention, the second gesture produces a single output. In FIGS. 14A–14D the single output is labeled "a".

The second gesture according to the present invention is implemented by two sequential activations. These are also referred to herein as two "short" activations. The second type of gesture generates a single output with two sequential activations of any two input detectors based on first timing conditions. In this double sequence the order of activation is significant, but the order of deactivation (i.e., release of a key) is not.

These first timing conditions are illustrated in FIGS. 14A–14D. The first timing conditions comprise detecting a first activation of one of the input detectors, followed within a first predetermined time period by detecting a second activation of one of the predetermined detectors. According to the first timing conditions, neither the first nor the second activation last for more than a second predetermined time period and the first activation ends before, after or simultaneously with the end of the second activation.

Figure 14A:
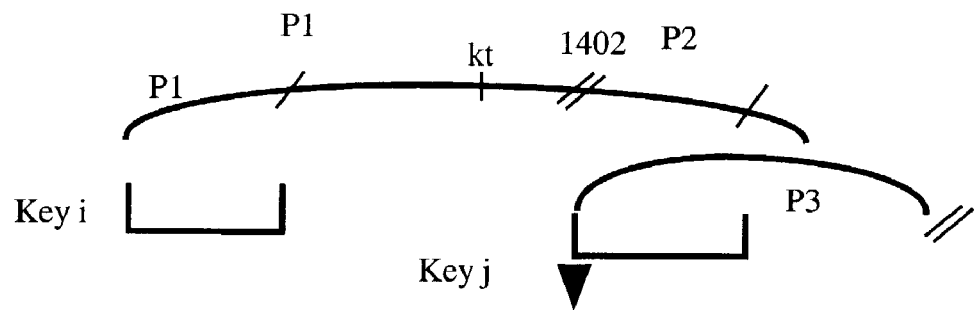

A specific example of the first timing condition is illustrated in FIG. 14A. A first activation of one of the input detectors (Key i) is detected, but ends before a first predetermined period P1 (kt), and before a second input detector is detected. Within a second predetermined time period kt (P2), a second activation of one of the input detectors (Key j) is then detected. The second activation ends before the end of another predetermined time period kt (P3), which starts at the beginning of the second activation. The single output generated by the sequential activation of Keys i and Key j is output at the beginning of the second activation, as illustrated by the result "a" in FIG. 14A. For example, referring to FIGS. 2A and 2H, a short activation of the third input detector during period P1 falling within period P2 followed by a short activation of the second input detector during period P3 will produce the letter "i". Conversely, sequential short activations of the second and third input detectors will produce the letter "a".

Figure 14B:
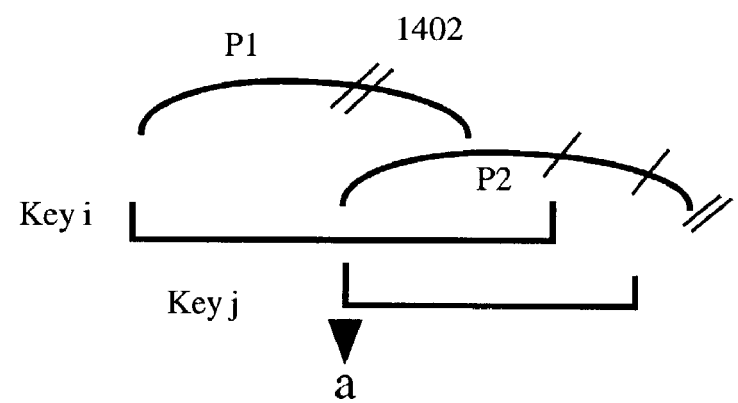
Figure 14C:
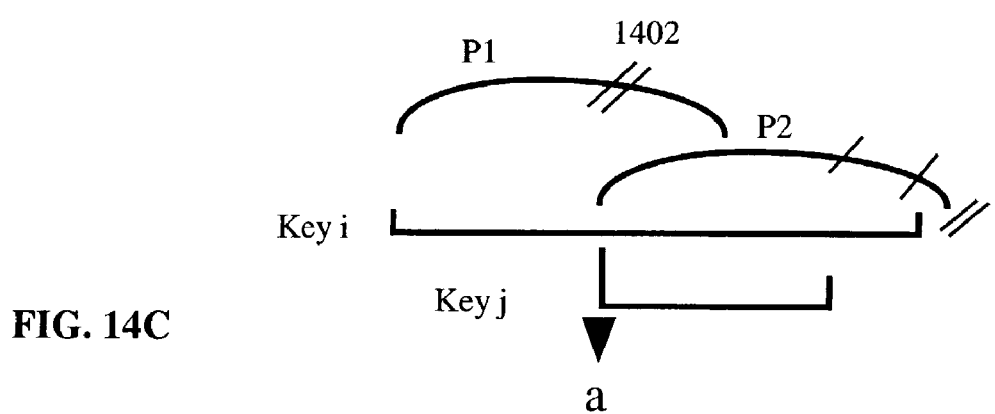
Figure 14D:
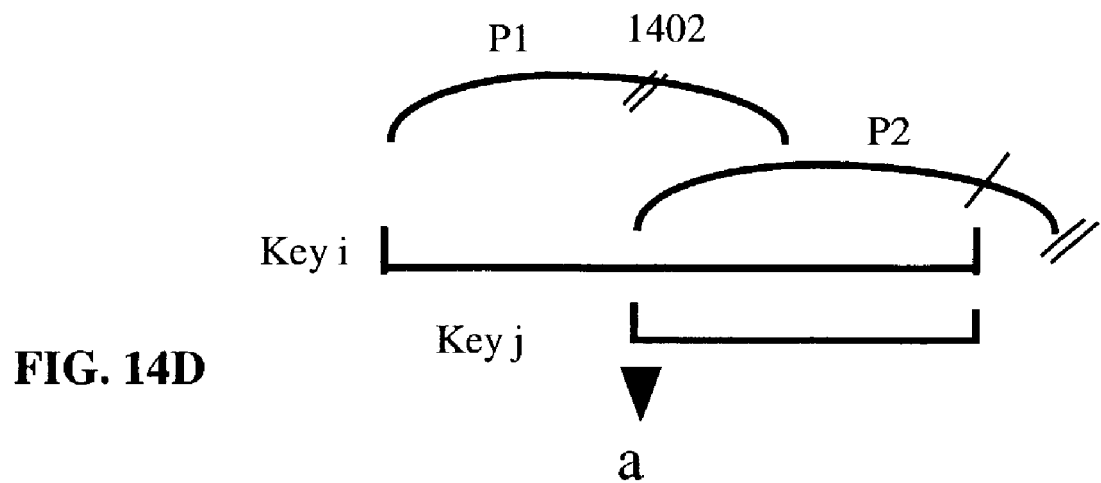

FIGS. 14B–14D illustrate the other three instances of the first timing conditions in which the activation of Key j begins prior to the end of Key i's activation. In the three instances shown in FIGS. 14B–14D, both activations end before the end of a second predetermined time period. In all three instances, a single output "a" is produced at the beginning of the activation of Key j, regardless of whether the activation of Key i ends before the activation of Key j, after the activation of Key j, or simultaneously with the end of the activation of Key j.

As apparent from FIGS. 14B–14D, the activation of Key j in all three instances is for a time period less than the second predetermined time period. As also noted from these figures, Key i can be longer than the first predetermined time period, but this does not trigger the conditions described below relating to a "long" activation. The activation of a second key within the first predetermined period P1 eliminates the first predetermined period by the reset event FIG. 14B (1402) caused by the activation of Key j.

The critical characteristic of this gesture is the high speed at which it could be made. The simplicity of the movement required is achieved by the lack of need for controlling the release sequence of the fingers. Any release order is successful, only the order of activation is significant. This requirement is congruent with normal movement ballistics where we attend to the initiation of a throw or hit and allow the movement to rebound in a passive, elastic and less controlled manner.

In addition, as the speed of input increases the two key pushes will tend to be activated as an ordered unit. The result is an inverse relationship between speed of input and errors caused by key pushes being held too long and reaching the end of the predetermined period P2, as depicted in FIGS. 14A–14D. The fingers will naturally rebound from the keys making the potential for overstepping the predetermined time period less likely. Strings of these two finger gestures can be concatenated to produce higher order gestures resulting from "chunking" or coordinating movements into a smoothly flowing unitary gesture.

Figure 15A:
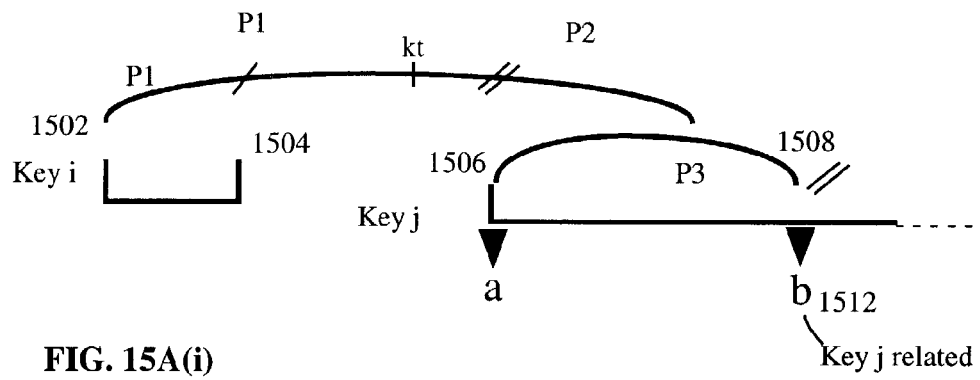

FIGS. 15A–15D illustrate a third gesture according to the present invention. In contrast to the second gesture, both the order of activation and the order of release are critical to generating the desired output. The third gesture of the present invention comprises a sequential activation of any two input detectors based on second timing conditions, which generates two single outputs. A first example of this timing condition is shown in FIGS. 15A(i) and (ii). This comprises detecting the first activation of one of the input detectors, 1502 which ends 1504 before the end of the first predetermined time period P1. Within a second predetermined time period P2 it is followed by a second activation 1506 of one of the input detectors, which is held beyond 1508, the end of the third predetermined time period P3.

A first output "a", occurs at the beginning of the second activation and a second output "b" occurs, at the end of the third predetermined time period P3. The first output is intentionally activated by the user coincident with the second keypush, and the second output is intentionally activated by the user when s/he holds one of the keys beyond the predetermined period P3.

For example, with reference to FIGS. 15A(i), 15A(ii) 2A and 2J, a first activation and release of Key i (using index finger) during period P1, followed within P2 by an activation of Key j (using middle finger) lasting longer than period P3 will produce the characters "at". The conditions in FIG. 15A(ii) produce identical results when the second activation occurs within the first predetermined period P1, but after the end of the first activation. In 15 A(i) additional time is available so that two activations by the same finger are still easily achieved.

Figure 15B:
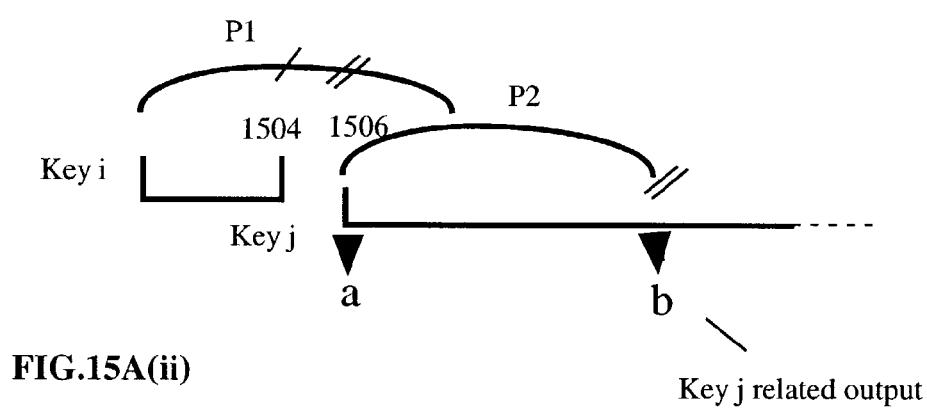
Figure 15B:
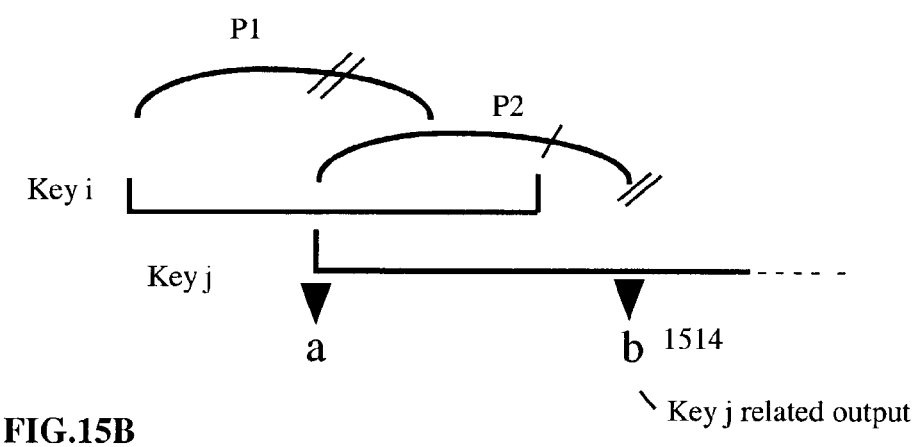
Figure 15C:
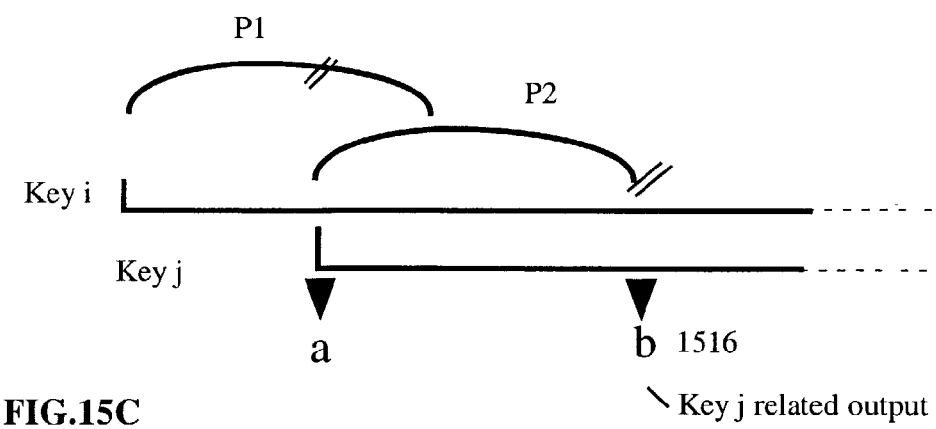
Figure 15D:
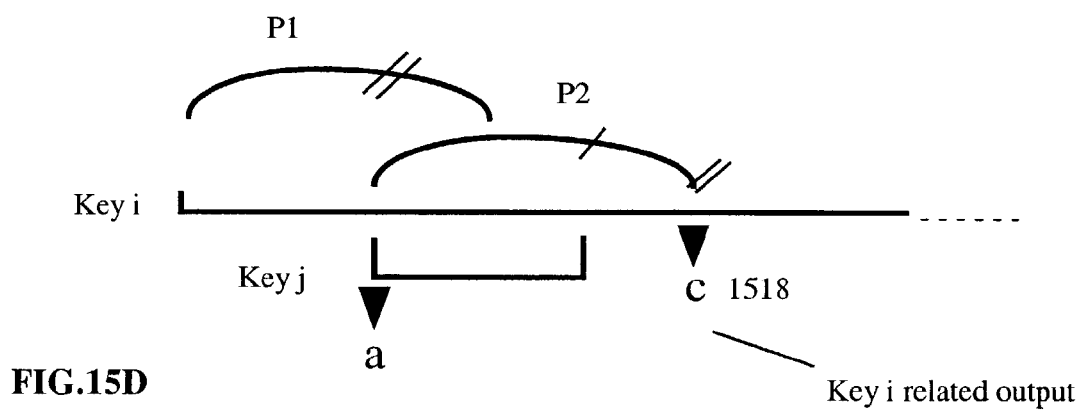

Three further examples of the second timing conditions are illustrated in FIGS. 15B–15D. The second timing conditions comprise detecting a first activation of one of the input detectors (Key i) followed within a first predetermined time period P1 by a second activation of another one of the input detectors (Key j), wherein at least one of the first or second activations last for more than a second predetermined time period P2.

As illustrated in FIG. 15B, if only the second activation, Key j, lasts for more than the second predetermined time period P2, then the second output "b" 1514 is related to this second activation.

Examining FIG. 15C, we note that if both the first, (Key i), and second, (Key j), activations last for more than the second predetermined time period P2, then the second output "b" 1516, is also related to the activation of the second input detector, even though key i is also being held for more than the predetermined period P2. In this case an additional mechanism is enrolled to determine the output-related key so as to maintain a consistent relationship to the sequential order of Key i and Key j. By polling the keys in the same order that they are activated it is possible to determine that the second key is the significant key to which the output "b" 1516 in FIG. 15C is related. From the users perspective this maintains the consistency of the interface logic, as sequences depicted in FIG. 15A to FIG. 15C all produce the same output.

As illustrated in FIG. 15D, if only the first activation (Key i) lasts for more than the second predetermined time period P2, the second output "c", is related to the activation of the first input detector Key i. This difference is possible because the release of Key j causes a reset of its counter and leaves only Key i activated at the end of predetermined period P2. Key j therefore completes a full cycle of activation and release before the end of P2, while Key i is held beyond P2. Both the order of activation and the order of release of key i and key j are therefore significant in gesture three, but both have a predictable, one-to-one relationship to outputs "a", "b" and "c".

Figure 16:
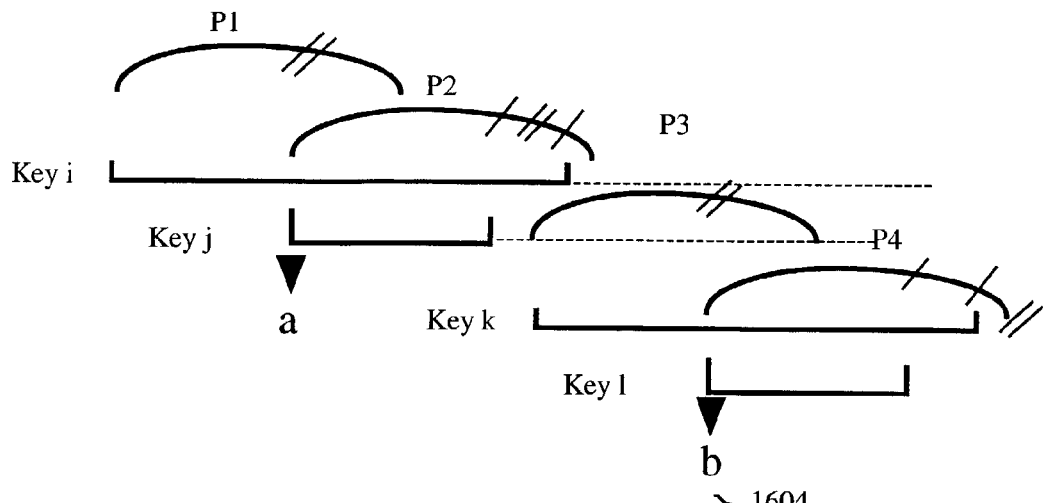

In FIG. 16, concatenations of sequential activations are described in connection with the present invention. FIG. 16 illustrates four activations Key i, Key j, Key k and Key l, and four predetermined time periods P1,P2,P3 and P4. Key i and Key j represent a sequential activation such as described above in FIGS. 14B–14D. Similarly, Key k and Key l also represent sequential activations such as described above in FIGS. 14B–14D. Referring to FIG. 16 and FIG. 2A it is apparent that output "a", resulting from the sequential activation of Key i and Key j could correspond to production of the character "s", if Key i was the ring finger and Key j was the middle finger. Output "b" resulting from the sequential activation of Key k and Key l, could correspond to production of the character "h", if Key k was the index and Key l was the thumb.

Concatenation of six activations with similar timing characteristics would yield three outputs, and so on. These activations can proceed at a maximum speed, which is inherently conducive to errorless use, as no key will be held beyond a predetermined period. Of interest is how, when six, sequential activations are produced, the gestures can become reorganized into new higher order types of gestures that are "emergent", meaning they do not exist at a lower level. Referring to FIG. 2A, it is clear that an activation using middle (3), index(2) and thumb(1) in the order 32 13 21 would produce characters "ich". But even slight familiarity with this sequence will cause a shift in the phrasing of the movements into two rapidly repeated sequences of "321" and "321". Three gestures of two activations each have been transformed into two gestures of three activations each. Both cognitive and ergonomic factors have been simplified. But three fast sequential activations do not normally produce more than one output in this method, as the last activation would timeout, and therefore this gesture of "321 321" is a novel, higher order "emergent" level of gesture. No change of coding or timing occurs, only the efficiency of organization of movements has altered. Emergent gestures mirror the natural process occurring in handwriting skill where frequent, practiced sequences of letters are produced by a single flowing movement. Cursive writing is designed to achieve this aim. The process described here is analogous to this normal patterning of learnt automatic movements involved in skilled handwriting and skilled typing.

Similar concatenations of gestures including double short and single-held activations are illustrated in FIGS. 17A–17D. In FIGS. 17A–17D one of the input detectors is activated beyond the last predetermined period P4, initiated by the penultimate activation. Thus, in each of FIGS. 17A–17D, three outputs are generated by four activations. The different final outputs ("d", "e", "f," and "g") in each case are related to the specific key being held beyond the last predetermined period.

Figure 17A:
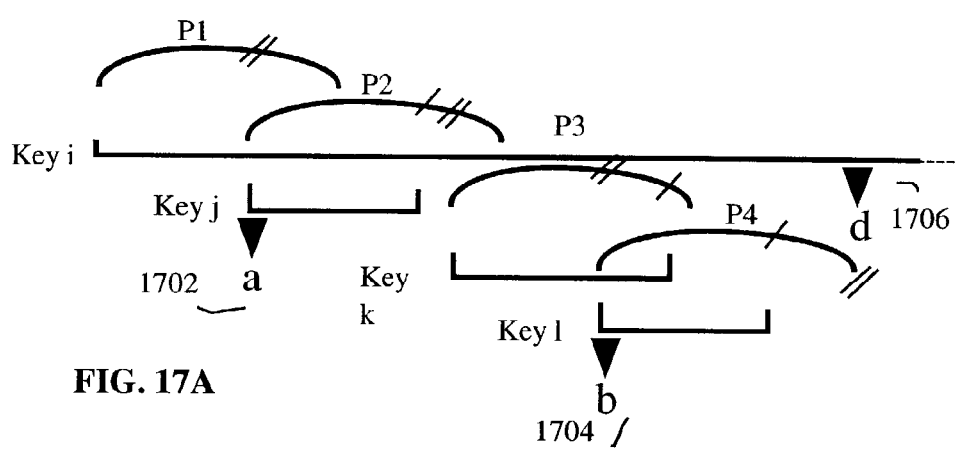
Figure 17B:
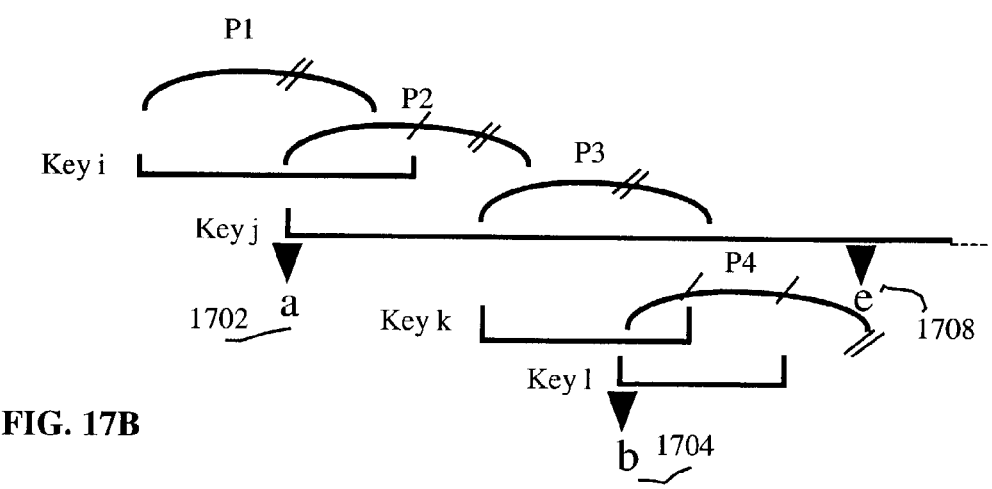
Figure 17C:
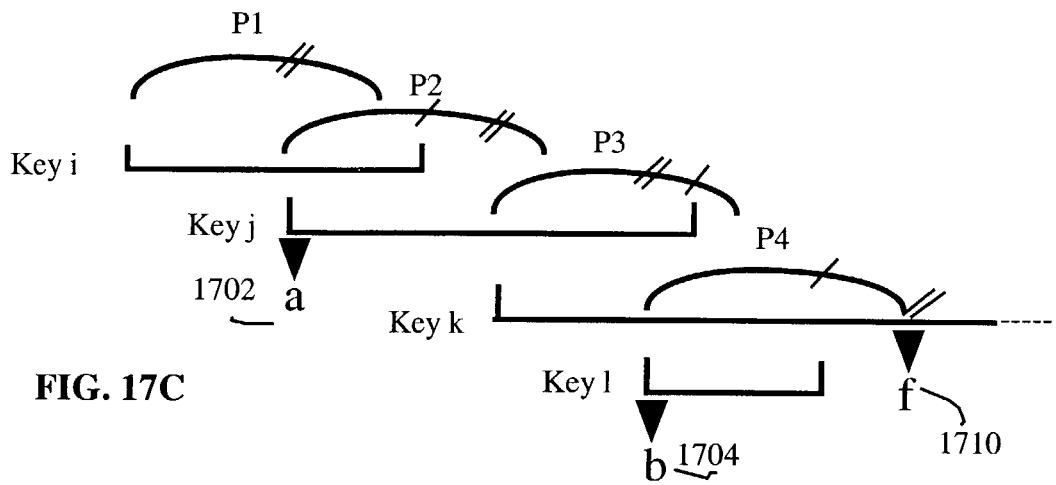
Figure 17D:
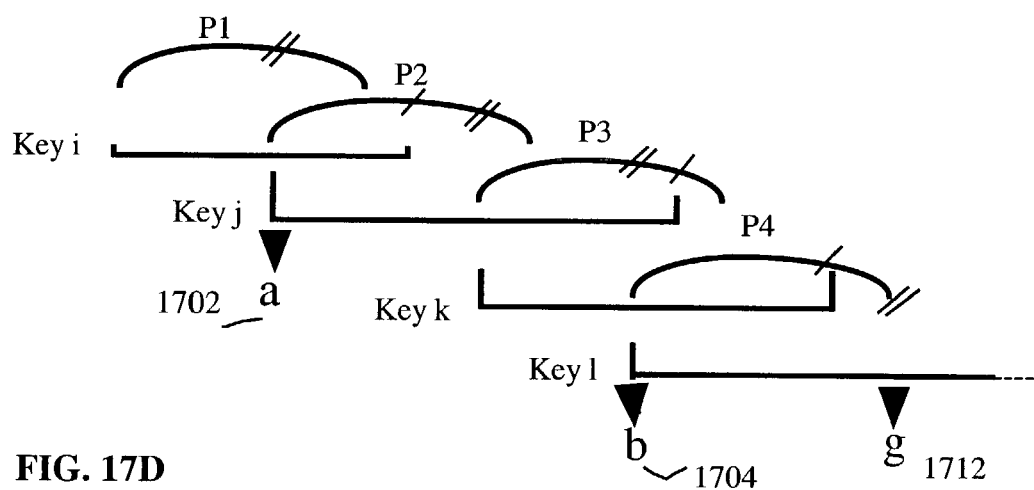

For example, referring to FIG. 17D and FIG. 2A, output "a", resulting from the sequential activation of Key i and Key j, corresponds to production of the character "s". Output "b", resulting from the sequential activation of Key k and Key l, corresponds to production of the character "h". Output "g", resulting from the sustained activation of Key i beyond P4, corresponds to the character "e". The word "she" is therefore produced with a concatenated, fluid, coordinated single gesture involving four fingers of one hand. The cognitive decision processes involved in the method described here, appear identical to those underlying the normal writing process. We decide to write the word "she" and do so as a single act, congruent and integrated on cognitive, linguistic, and physical levels.

Notwithstanding that the present technique uses counters or timing of activation of activators to determine outputs, alternative methods of discrimination of activations are contemplated by the inventor. The detection of various levels of pressure, varying direction of movement, or varying speed of movement are envisaged methods of implementation of the logic used by this invention. Thus, persons having ordinary skill in the art are capable of integrating detectors that can be used to detect pressure, direction or speed to implement the above described gestures without departing from the spirit and scope of the present invention.

XI. Hardware Implementations

FIGS. 18A and 18C illustrate exemplary hardware implementations according to the present invention. The system 1800 of FIG. 18A comprises a user interface 1802 having 2-N detectors 1804 and a display device 1806, an activation recognition unit 1808, and the converter 1810 that produces the defined output data 1812 based on rules 1814.

The 2-N input detectors 1804 of the user interface 1802 comprise keys of a keyboard, the touch screen device, discrete switches, or the like, as would become apparent to a person having ordinary skill in the art based on the present disclosure. For example, a disable person who only has voluntary motor control above the neck could activate input detectors mounted in head gear using head movements, or access activators within the mouth using tongue movements. Alternatively, input detectors 1802 can comprise optical switches that detect movement of a user's fingers, or other body part.

The input detectors 1804 are coupled to the activation recognition unit 1808 via interconnect lines or a bus 1816, or the like. The activation recognition unit performs preprocessing of information provided by the input detectors 1804, so as to avoid switch bounce or similar phenomenon. Activation recognition unit 1808 is coupled to converter 1810 by interconnect lines or a bus 1818, or the like.

Based on a set of gesture rules 1814, the converter 1810 produces defined output data 1812, as described above in connection with the gestures of the present invention. In other words, the converter 1810 correlates detected activations and their timing based on the gesture rules 1814 to produce the defined output data 1812. The defined output data 1812 can be provided to a display 1806 in user interface 1802. The display 1806 can also display the diagonalized stem-and-leaf diagram 200. Display 1806 comprise a single display screen so that the user can simultaneously review define output data produced by activation of the input detectors while viewing the diagram 200. Alternatively, the defined output data 1812 and diagram 200 can be displayed to the user on separate display screens.

Gesture rules 1814 and defined output data 1812 can be stored in a common memory unit. Alternatively, they can be stored separately, as would become apparent to a person having ordinary skill in the art.

FIGS. 18B and 18C show alternative embodiments for the system 1800. By way of example and not limitation, FIG. 18B shows a combined detector/activation recognition unit 1820 coupled to a combined converter/rule unit 1822, which in turn outputs defined output data 1824 to display 1826. Unit 1822 can comprise memory for storing the rules and the output data. Alternatively, as illustrated in FIG. 18C, detectors 1804 can be coupled to a combined activation recognition unit/converter 1830. In this example, the rules and define output data are stored in a common storage unit 1832. Activation recognition unit/converter 1830 is also coupled to a display 1834 and an optional transmitter 1836. The transmitter 1836 can transmit the defined output data and/or the diagram 200 to a remote location, or to a remote data processing system, a network, a remote smart display, or the like. Transmissions can be by light, infrared, radio frequency, ultra wideband, or the like. Other configuration of system 1800 will become apparent to the person having ordinary skill in the art based on the present disclosure, without departing from the spirit and scope of the present invention.

XII. Incorporation in Other Devices

While the invention can be implemented strictly as a data entry device as shown in FIG. 1, it can also be implemented in other forms. In an alternative embodiment, the invention can be implemented using a traditional QWERTY keyboard, by reprogramming six appropriately selected keys to serve as keys one through five. Such reprogramming is within the capability of a person of ordinary skill in the relevant art. Alternatively, the invention can be incorporated into other information devices. The invention can be used to input text into a PDA, for example. The invention can also be used in any device that supports text composition and therefore requires a means of text input. Such devices include certain cellular telephones and pagers. The composed text then can be transmitted as a message and/or saved to memory.

XIII. Example Implementations

A. Example Hardware/Software/Firmware Implementations

The present invention can be implemented in hardware, software, firmware, and/or combinations thereof, including, without limitation, gate arrays, programmable arrays ("PGAs"), fast PGAs ("FPGAs"), application-specific integrated circuits ("ASICs"), processors, microprocessors, micro controllers, and/or other embedded circuits, processes and/or digital signal processors, and discrete hardware logic. The present invention is preferably implemented with digital electronics but can also be implemented with analog electronics and/or combinations of digital and analog electronics.

B. Example Computer Program Implementations

The present invention can also be implemented in computer-readable code, or software, that executes on a computer system. FIG. 19 illustrates an example computer system 1900, in which the present invention can be implemented as computer-readable code. Various embodiments of the invention are described in terms of this example computer system 1900. After reading this description, it will become apparent to a person skilled in the relevant art how to implement the invention using other computer systems and/or computer architectures.

In the present invention, all of the signal processing blocks of the present invention can execute on one or more distinct computer systems 1900, to implement the various methods of the present. The computer system 1900 includes one or more processors, such as processor 1904. Processor 1904 can be a special purpose or a general-purpose digital signal processor. The processor 1904 is connected to a communication infrastructure 1906 (for example, a bus or network). Various software implementations are described in terms of this exemplary computer system. After reading this description, it will become apparent to a person skilled in the relevant art how to implement the invention using other computer systems and/or computer architectures.

Computer system 1900 also includes a main memory 1905, preferably random access memory (RAM), and may also include a secondary memory 1910. The secondary memory 1910 may include, for example, a hard disk drive 1912 and/or a removable storage drive 1914, representing a floppy disk drive, a magnetic tape drive, an optical disk drive, etc. The removable storage drive 1914 reads from and/or writes to a removable storage unit 1915 in a well-known manner. Removable storage unit 1915, represents a floppy disk, magnetic tape, optical disk, etc., which is read by and written to by removable storage drive 1914. As will be appreciated, the removable storage unit 1915 includes a computer usable storage medium having stored therein computer software and/or data.

In alternative implementations, secondary memory 1910 may include other similar means for allowing computer programs or other instructions to be loaded into computer system 1900. Such means may include, for example, a removable storage unit 1922 and an interface 1920. Examples of such means may include a program cartridge and cartridge interface (such as that found in video game devices), a removable memory chip (such as an EPROM, or PROM) and associated socket, and other removable storage units 1922 and interfaces 1920 which allow software and data to be transferred from the removable storage unit 1922 to computer system 1900.

Computer system 1900 may also include a communications interface 1924. Communications interface 1924 allows software and data to be transferred between computer system 1900 and external devices. Examples of communications interface 1924 may include a modem, a network interface (such as an Ethernet card), a communications port, a PCMCIA slot and card, etc. Software and data transferred via communications interface 1924 are in the form of signals 1925 which may be electronic, electromagnetic, optical or other signals capable of being received by communications interface 1924. These signals 1925 are provided to communications interface 1924 via a communications path 1926. Communications path 1926 carries signals 1925 and may be implemented using wire or cable, fiber optics, a phone line, a cellular phone link, an RF link and other communications channels.

In this document, the terms "computer program medium" and "computer usable medium" are used to generally refer to media such as removable storage drive 1914, a hard disk installed in hard disk drive 1912, and signals 1925. These computer program products are means for providing software to computer system 1900.

Computer programs (also called computer control logic) are stored in main memory 1908 and/or secondary memory 1910. Computer programs may also be received via communications interface 1924. Such computer programs, when executed, enable the computer system 1900 to implement the present invention as discussed herein. In particular, the computer programs, when executed, enable the processor 1904 to implement the processes of the present invention. Accordingly, such computer programs represent controllers of the computer system 1900. By way of example, in the embodiments of the invention, the processes performed by the signal processing blocks of the present invention can be performed by computer control logic. Where the invention is implemented using software, the software may be stored in a computer program product and loaded into computer system 1900 using removable storage drive 1914, hard drive 1912 or communications interface 1924.

A user-interface 1930 is coupled to communication infrastructure 1906. User-interface 1930 can comprise user-interface 1802, or user-interface 1802 and activation recognition unit 1808, for example. User-interface 1930 can include a combination of software and hardware. For example, in the case of a graphical user-interface (GUI), user-interface 1930 can include both hardware (such as a display) and associated control logic for interfacing between the display and any applications using the GUI.

XIV. Example Computer Program Product Embodiment

The present invention can be implemented at least in part as a computer program product. The logic therein maps the specific actions of a user to specific characters. In an embodiment of the invention, the computer program product is implemented on a computer and maps keys of a QWERTY keyboard, and the actions performed thereon, to the specific characters as described above. Alternatively, the computer program product is implemented on another information device (such as a cell phone, PDA, pager, or the like). Here, the logic of the computer program product maps five (or six) buttons or keys and the actions performed thereon, to specific characters.

Various known programming languages can be used to implement the present invention based on the teaching herein. Independent programming of the method of the present invention will differ when using discrete input detectors in a "stand alone" device, for example. For example, to poll consecutive key activations, a next key activation must be detected while the previous key is still down. On a normal keyboard this is achieved through software contained in ROM that creates n-key rollover, allowing for any number of keys to be held and still read a subsequent key push. This would be coded differently in an implementation not using a standard keyboard. Other implementation specific details, such as the programming language used, will become apparent to a person skilled in the programming art.

XV. Conclusion

Two contrary aims are achieved by the present invention. Speed and error rate have a reciprocal relationship. The fastest gesture is simpler in form and requires the least control, and the slowest gesture can be more complex but with time for the additional control demands to be met. Thus, comparing the double sequence (Gesture 2) with the double plus hold (Gesture 3), it is apparent that the former only requires that the order of activation is significant but the release order is not. The gesture tends towards a light touch as speed increases and tension does not increase. The slower Gesture 3 involves two orders of activation and two orders of release to obtain all possible outputs. But Gesture 3 inherently allows for more time as the final finger is held for a specific time duration. In the double fast sequence, the order in which the keys are activated is significant, but the order of release is not. The importance for the user is that these gestures can be performed at high speed. Therefore, progressively more difficult control does not result from an increase in speed.

The resulting rhythmic sequences of finger movements grouped into coherent units, each representing a unique text output, captures the essence of musical performance. We are capable of recognizing and performing an infinite variety of melodies precisely because of the power of rhythmic variety. This is a critical component in human action and is one of the fundamental sources of inspiration for this invention. Every word will have a distinctive pattern of input and sub-sets of digraphs, syllables and other combinations of movements will become familiar cohesive gestures easily combined into larger units. This process can only occur if each gesture is an independent whole that can be combined in multiple arrangements without losing its identity. The invention thus successfully retains the one-to-one identity of gesture and output that was shown to be critical in the introductory exposition. Combining gestures into cohesive units is really another way of describing the process of automaticity. The invaluable result is an ever-decreasing cognitive involvement in the detailed decision processes underlying text creation. Only in the initial stages of learning to write does a child need to make constant decisions about individual letters. As writing and spelling skills develop these attentional and cognitive demands diminish, until writing becomes automatic leaving the mind free to focus on issues of language and content. Because of the invention's simplicity, it would be extremely economical to produce and therefore potentially affordable to all. It also contains the potential for use as a new method of communication for disabled individuals, particularly those who are deaf-and-blind.

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof, as was described above in connection with FIGS. 18A–C and 19, for example. Thus, the breadth and scope of the present invention should not be limited by any of the above-described exemplary embodiments, but should be defined only in accordance with the following claims and their equivalents.

All references cited herein as background are incorporated herein by reference.

What is claimed is:

1. In a data processing system having at least two input detectors, a method that permits a user, using the fingers of a single hand, to produce defined outputs, such as generating characters and executing commands, comprising:
   a) generating a first single output with single activation of any one of the input detectors;
   b) generating a second single output with sequential activation of any two of the input detectors based on first timing conditions; and
   c) generating a digraph comprised of a third single output and a fourth single output with sequential activation of any two of the input detectors based on second timing conditions.

2. The method of claim 1, wherein said step (a) comprises detecting activation of the any one of the input detectors beyond a predetermined time period.

3. The method of claim 1, wherein said step (b) comprises permitting sequential activation of the same detector.

4. The method of claim 1, wherein the first timing conditions of said step (b) comprise: detecting a first activation of one of the input detectors; and followed within a first predetermined time period by detecting a second activation of one of the input detectors, wherein neither said first nor said second activation lasts for more than a second predetermined time period, and said first activation ends one of before, after and simultaneously with an end of said second activation.

5. The method of claim 1, wherein the first timing conditions of step (b) comprise: detecting a first activation of one of the input detectors, said first activation ending before an end of a first predetermined time period; and followed within a second predetermined time period by a second activation of one of the input detectors, said second activation ending before an end of a third predetermined time period beginning at a start of said second activation.

6. The method of claim 1, wherein the second timing conditions of said step (c) comprise: detecting a first activation of one of the input detectors; and followed within a first predetermined time period by a second activation of another one of the input detectors, wherein at least one of said first and said second activations last for more than a second predetermined time period.

7. The method of claim 6, wherein for said step (c), if only said first activation lasts for more than the second predetermined time period, the second output is related to the one of the input detectors, otherwise if both of said first and said second activations last for more than the second predetermined time period, or if only said second activation lasts for more than the second predetermined time period, then the second output is related to the another one of the input detectors.

8. The method of claim 6, wherein the third single output is produced at a start of said second activation of another one of the input detectors and the fourth single output is produced at end of the second predetermined time period.

9. The method of claim 1, wherein the second timing conditions of said step (c) comprise: detecting a first activation of one of the input detectors, said first activation ending before an end of a first predetermined time period; and followed within a second predetermined time period by a second activation of one of the input detectors, said second activation ending after an end of a third predetermined time period beginning at a start of said second activation.

10. The method of claim 9, wherein the third single output is produced at a start of said second activation of another one of the input detectors and the fourth single output is produced at end of the third predetermined time period.

11. The method as in any one of claims 1, 4, 5, 6, and 9, further comprising providing a number of input detectors selected from the group consisting of 5, 6 or 7 input detectors.

12. The method of claim 1, comprising concatenating sequential enactments of step (b) followed by step (c), wherein at least one of said first through said fourth activations lasts for more than a fourth predetermined time period.

13. The method of claim 1, further comprising: displaying a diagram to the user, wherein the diagram depicts the characters or commands corresponding to possible activations.

14. The method of claim 13, further comprising displaying the diagram depicting each of the characters of an alphabet capable of being activated with only five detectors.

15. The method of claim 14, further comprising displaying the diagram depicting a matrix of cells arranged in rows and columns, wherein each grouping of cells in a given row represents activations associated with a corresponding detector.

16. The method of claim 15, wherein single gesture outputs are prominently depicted in cells along a diagonal of the matrix.

17. The method of claim 15, wherein one cell of each row is distinguished by an attribute to represent the final activation of a sequence of two activations of any two detectors, wherein the attribute is size, color, shape or font.

18. The method of claim 1, further comprising: providing at least five input detectors; and arranging the at least five input detectors so that the user need not laterally extend any fingers to activate the detectors once the user orients those fingers with a corresponding detector.

19. The method of claim 18, further comprising: displaying a diagram to the user, wherein the diagram depicts the characters or commands corresponding to possible activations, wherein the diagram depicts a matrix of cells arranged in rows and columns, and wherein each cells in a given row represents activations associated with a corresponding detector.

20. The method of claim 19, further comprising: providing an additional information on the diagram to depict activations associated with more than five detectors.

21. The method of claim 1, further comprising generating no output upon a first activation of any one of the input detectors that lasts less than a predetermined period and said first activation is not following within a further predetermined period by a second activation of any one of the input detectors.

22. The method of claim 1, wherein the first through fourth single outputs relate to any writing system of multiple languages.

23. The method of claim 1, further comprising relating sequential activations of detectors to digraph probabilities of a language writing system, resulting maximal ratio of digraphs output to total activations.

24. The method of claim 1, wherein the first through fourth single outputs are sequentially combined to represent a different single defined output.

25. A data processing system that permits a user, using the fingers of a single hand, to produce defined outputs, such as generating characters and executing commands, comprising: at least two input detectors; an activation recognition unit, coupled to said at least two input detectors, that receives signals from said detectors and determines whether an activation was produced by the user's fingers; and a converter, coupled to said activation recognition unit, that produces a first single output with single activation of any one of the input detectors; a second single output with sequential activation of any two of the input detectors based on first timing conditions; and a diagraph comprising a third single output and a fourth single output with sequential activation of any two of the input detectors based on second timing conditions.

26. The system of claim 25, further comprising a display coupled to said converter to display said outputs.

27. The system of claim 26, wherein said display displays a diagram to the user, wherein said diagram depicts the characters or commands corresponding to possible activations.

28. The method of claim 27, wherein said diagram depicts each of the characters of an alphabet capable of being activated with only five detectors.

29. The system of claim 28 wherein said diagram comprises matrix of cells arranged in rows and columns, wherein each grouping of cells in a given row represents activations associated with a corresponding detector.

30. The system of claim 29, wherein single gesture outputs are prominently depicted in cells along a diagonal of the matrix.

31. The system of claim 29, wherein one cell of each row is distinguished by an attribute to represent the final activation of a sequence of two activations of any two detectors, wherein the attribute is size, color, shape or font.

32. The system of claim 25, further comprising a memory coupled to said converter to store said outputs.

33. The system of claim 25, further comprising a transmitter coupled to said converter to transmit said outputs.

34. The system of claim 25, wherein said first single output is produced by activation of any one of the input detectors beyond a predetermined time period.

35. The system of claim 25, wherein said second single output is produced by sequential activation of the same detector.

36. The system of claim 25, wherein the first timing conditions comprise:
detecting a first activation of one of the input detectors; and followed within a first predetermined time period by detecting a second activation of one of the input detectors, wherein neither said first nor said second activation lasts for more than a second predetermined time period, and said first activation ends one of before, after and simultaneously with an end of said second activation.

37. The system of claim 25, wherein the first timing conditions comprise:
detecting a first activation of one of the input detectors, said first activation ending before an end of a first predetermined time period; and followed within a second predetermined time period by a second activation of one of the input detectors, said second activation ending before an end of a third predetermined time period beginning at a start of said second activation.

38. The system as in any one of claims 4, 5, 36, and 37 wherein the second single output is produced at a start of said second activation.

39. The system of claim 25, wherein the second timing conditions comprise:
detecting a first activation of one of the input detectors; and followed within a first predetermined time period by a second activation of another one of the input detectors, wherein at least one of said first and said second activations last for more than a second predetermined time period.

40. The system of claim 39, wherein for said second single output, if only said first activation lasts for more than the second predetermined time period, the second output is related to the one of the input detectors, otherwise if both of said first and said second activations last for more than the second predetermined time period, or if only said second activation lasts for more than the second predetermined time period, then the second output is related to the another one of the input detectors.

41. The system as in any one of claims 4, 6, 36 and 39, wherein the second predetermined time period begins at a start of said second activation.

42. The system of claim 39, wherein the third single output is produced at a start of said second activation of another one of the input detectors and the fourth single output is produced at end of the second predetermined time period.

43. The system as in any one of claims 4, 6, 36 and 39, wherein the first and second predetermined time periods are of approximately the same duration.

44. The system of claim 25, wherein the second timing conditions comprise:
detecting a first activation of one of the input detectors, said first activation ending before an end of a first predetermined time period; and followed within a second predetermined time period by a second activation of one of the input detectors, said second activation ending after an end of a third predetermined time period beginning at a start of said second activation.

45. The system of claim 44, wherein the third single output is produced at a start of said second activation and the fourth single output is produced at end of the third predetermined time period.

46. The system as in any one of claims 5, 9, 37 and 44, wherein the first and third predetermined time periods are of approximately the same duration.

47. The system as in any one of claims 5, 9, 37 and 44, wherein the firsts second and third predetermined time periods are of approximately the same duration.

48. The system as in any one of claims 5, 9, 37 and 44, wherein the second predetermined time period begins at an end of said first activation.

49. The system as in any one of claims 25, 36, 37, 42 and 44 further comprising providing a number of input detectors selected from the group consisting of 5, 6 or 7 input detectors.

50. The system of claim 25, comprising concatenating sequential enactments activations corresponding to the first timing conditions followed by activations corresponding to the second timing conditions, wherein at least one of said first through said fourth activations lasts for more than a fourth predetermined time period.

51. The system of claim 25, further comprising: at least five input detectors arranged so that the user need not laterally extend any fingers to activate the detectors once the user orients those fingers with a corresponding detector.

52. The system of claim 49, further comprising a display that displays a diagram to the user, wherein the diagram depicts the characters or commands corresponding to possible activations, wherein the diagram depicts a matrix of cells arranged in rows and columns, and wherein each cells in a given row represents activations associated with a corresponding detector.

53. The system of claim 52, wherein said display provides additional information depicting activations associated with a further input detector.

54. The system of claim 25, wherein said converter further produces a null output upon a first activation of any one of the input detectors that lasts less than a predetermined period and said first activation is not following within a further predetermined period by a second activation of any one of the input detectors.

55. The system of claim 25, wherein the first through fourth single outputs relate to any writing system of multiple languages.

56. The system of claim 25, wherein the first through fourth single outputs relate sequential activations of detectors to digraph probabilities of a language writing system, resulting in an increased ratio of dig raphs output to the number of activations.

57. The system of claim 25, wherein the first through fourth single outputs are sequentially combined to represent a different single defined output.

58. A computer program product comprising a computer useable medium having control logic stored therein for causing a computer, having at least two input detectors, to permit a user, using the fingers of a single hand, to produce defined outputs, such as generating characters and executing commands, the computer control logic comprising: first computer readable program code means for causing the computer to generate a first single output with single activation of any one of the input detectors; second computer readable program code means for causing the computer to generate a second single output with sequential activation of any two of the input detectors based on first timing conditions; and third computer readable program code means for causing the computer to generate a digraph comprising a third single output and a fourth single output with sequential activation of any two of the input detectors based on second timing conditions.

59. The computer program product of claim 58, wherein said first computer readable program code means causes the computer to detect activation of any one of the input detectors beyond a predetermined time period.

60. The computer program product of claim 58, wherein said second computer readable program code means causes the computer to permit sequential activation of the same detector.

61. The computer program product of claim 58, wherein the first timing conditions comprise: detecting a first activation of one of the input detectors; and
followed within a first predetermined time period by detecting a second activation of one of the input detectors, wherein neither said first nor said second activation lasts for more than a second predetermined time period, and said first activation ends one of before, after and simultaneously with an end of said second activation.

62. The computer program product of claim 58, wherein the first timing conditions comprise: detecting a first activation of one of the input detectors, said first activation ending before an end of a first predetermined time period; and followed within a second predetermined time period by a second activation of one of the input detectors, said second activation ending before an end of a third predetermined time period beginning at a start of said second activation.

63. The computer program product of claim 58, wherein the second timing conditions comprise: detecting a first activation of one of the input detectors; and
followed within a first predetermined time period by a second activation of another one of the input detectors, wherein at least one of said first and said second activations last for more than a second predetermined time period.

64. The computer program product of claim 63, wherein in connection with said third computer readable program code means, if only said first activation lasts for more than the second predetermined time period, the second output is related to the one of the input detectors, otherwise if both of said first and said second activations last for more than the second predetermined time period, or if only said second activation lasts for more than the second predetermined time period, then the second output is related to the another one of the input detectors.

65. The computer program product of claim 63, wherein the third single output is produced at a start of said second activation of another one of the input detectors and the fourth single output is produced at end of the second predetermined time period.

66. The computer program product of claim 58, wherein the second timing conditions of comprise: detecting a first activation of one of the input detectors, said first activation ending before an end of a first predetermined time period; and followed within a second predetermined time period by a second activation of one of the input detectors, said second activation ending after an end of a third predetermined time period beginning at a start of said second activation.

67. The computer program product of claim 66, wherein the third single output is produced at a start of said second activation of another one of the input detectors and the fourth single output is produced at end of the third predetermined time period.

68. The computer program product as in any one of claims 58, 61, 62, 63, and 66, further comprising providing a number of input detectors selected from the group consisting of 5,6 or 7 input detectors.

69. The computer program product of claim 58, comprising concatenating sequential enactments of said second computer readable program code means followed by enactments of said third computer readable program code means, wherein at least one of said first through said fourth activations lasts for more than a fourth predetermined time period.

70. The computer program product of claim 58, further comprising: fourth computer readable program code means for displaying a diagram to the user, wherein the diagram depicts the characters or commands corresponding to possible activations.

71. The computer program product of claim 70, further comprising further computer readable program code means for displaying the diagram depicting each of the characters of an alphabet capable of being activated with only live detectors.

72. The computer program product of claim 71, further comprising still further computer readable program code means for displaying the diagram depicting a matrix of cells arranged in rows and columns, wherein each grouping of cells in a given row represents activations associated with a corresponding detector.

73. The computer program product of claim 72, wherein single gesture outputs are prominently depicted in cells along a diagonal of the matrix.

74. The computer program product of claim 72, wherein one cell of each row is distinguished by an attribute to represent the final activation of a sequence of two activations of any two detectors, wherein the attribute is size, color, shape or font.

75. The computer program product of claim 58, further comprising: fourth computer readable program code means for receiving activations from at least five input detectors, wherein the at least live input detectors are arranged so that the user need not laterally extend any fingers to activate the detectors once the user orients those fingers with a corresponding detector.

76. The computer program product of claim 75, further comprising: fourth computer readable program code means for displaying a diagram to the user, wherein the diagram depicts the characters or commands corresponding to possible activations, wherein the diagram depicts a matrix of cells arranged in rows and columns, and wherein each cells in a given row represents activations associated with a corresponding detector.

77. The computer program product of claim 76, further comprising: further computer readable program code means for providing additional information on the diagram to depict activations.

78. The computer program product of claim 58, wherein the computer program product does not generate an output upon a first activation of any one of the input detectors that lasts less than a predetermined period and said first activation is not following within a further predetermined period by a second activation of any one of the input detectors.

79. The computer program product of claim 58, wherein the first through fourth single outputs relate to any writing system of multiple languages.

80. The computer program product of claim 58, further comprising fourth computer readable program code means for relating sequential activations of detectors to digraph probabilities of a language writing system, resulting maximal ratio of digraphs output to total activations.

81. The computer program product of claim 58, wherein the first through fourth single outputs are sequentially combined to represent a different single defined output.

* * * * *